(12) United States Patent
Wiercigroch

(10) Patent No.: US 10,125,547 B2
(45) Date of Patent: Nov. 13, 2018

(54) DRILLING APPARATUS

(71) Applicant: ITI Scotland Limited, Glasgow (GB)

(72) Inventor: Marian Wiercigroch, Aberdeen (GB)

(73) Assignee: ITI Scotland Limited, Glasgow (GB)

( * ) Notice: Subject to any disclaimer, the term of this patent is extended or adjusted under 35 U.S.C. 154(b) by 118 days.

(21) Appl. No.: 15/028,699

(22) PCT Filed: Oct. 9, 2014

(86) PCT No.: PCT/EP2014/071701
§ 371 (c)(1),
(2) Date: Apr. 11, 2016

(87) PCT Pub. No.: WO2015/052301
PCT Pub. Date: Apr. 16, 2015

(65) Prior Publication Data
US 2016/0251901 A1    Sep. 1, 2016

(30) Foreign Application Priority Data
Oct. 11, 2013  (GB) .................................. 1318020.3

(51) Int. Cl.
*E21B 7/24* (2006.01)
*E21B 49/00* (2006.01)
(Continued)

(52) U.S. Cl.
CPC .............. *E21B 7/24* (2013.01); *E21B 44/005* (2013.01); *E21B 49/003* (2013.01); *E21B 10/46* (2013.01);
(Continued)

(58) Field of Classification Search
CPC . E21B 7/24; E21B 44/005; E21B 6/00; E21B 49/003; E21B 44/04; E21B 10/46; E21B 2041/0028; G06F 17/13
See application file for complete search history.

(56) References Cited

U.S. PATENT DOCUMENTS 6,367,565 B1    4/2002  Hall
8,353,368 B2 *  1/2013  Wiercigroch ............. E21B 7/24
                                                              175/327
(Continued)

FOREIGN PATENT DOCUMENTS

GB    2364081 A    1/2002
GB    2485685 A    5/2012
(Continued)

OTHER PUBLICATIONS

Brassart, P., Written Opinion of the International Searching Authority, PCT/EP2014/071701, European Patent Office, dated Jun. 22, 2015.
(Continued)

*Primary Examiner* — Michael R Wills, III
(74) *Attorney, Agent, or Firm* — Gavrilovich, Dodd & Lindsey LLP

(57) ABSTRACT

Provided is an apparatus for use in resonance enhanced drilling, which apparatus comprises a drilling module comprising a drill-bit, wherein the apparatus further comprises:
  a sensor for measuring one or more parameters relating to the interaction of the drill-bit and the material being drilled; and
  a sensor for measuring one or more motions of the drill-bit.

21 Claims, 42 Drawing Sheets

(51) Int. Cl.
*E21B 44/00* (2006.01)
*E21B 41/00* (2006.01)
*E21B 10/46* (2006.01)
*E21B 44/04* (2006.01)
*G06F 17/13* (2006.01)

(52) U.S. Cl.
CPC ....... *E21B 44/04* (2013.01); *E21B 2041/0028* (2013.01); *G06F 17/13* (2013.01)

(56) References Cited

U.S. PATENT DOCUMENTS

| | | |
|---|---|---|
| 2002/0050168 A1 | 5/2002 | Bongers-Ambrosius et al. |
| 2007/0240904 A1 | 10/2007 | Stauffer et al. |
| 2009/0055135 A1 | 2/2009 | Tang et al. |
| 2009/0114445 A1 | 5/2009 | Dashevskiy |
| 2010/0319994 A1 | 12/2010 | Wiercigroch |
| 2011/0056750 A1* | 3/2011 | Lucon ............ E21B 7/24 175/56 |
| 2012/0130693 A1* | 5/2012 | Ertas ............ E21B 44/00 703/2 |
| 2012/0217067 A1* | 8/2012 | Mebane, III ............ E21B 44/02 175/57 |
| 2012/0234600 A1 | 9/2012 | Lee et al. |
| 2012/0241219 A1 | 9/2012 | Wiercigroch |
| 2014/0083772 A1* | 3/2014 | Wiercigroch ............ E21B 7/24 175/40 |
| 2014/0116777 A1* | 5/2014 | Wiercigroch ............ E21B 7/24 175/24 |

FOREIGN PATENT DOCUMENTS

| | | |
|---|---|---|
| GB | 2489227 A | 9/2012 |
| WO | 2007/141550 A1 | 12/2007 |
| WO | 2011/017626 A1 | 2/2011 |
| WO | 2012/076401 A1 | 6/2012 |
| WO | 2015/052301 A2 | 4/2015 |

OTHER PUBLICATIONS

Harnees, D., Patent Act 1977: Search Report under Section 17(5), Appl No. GB1318020.3, UK Intellectual Property Office, dated Mar. 28, 2014.

Lindner, Nora, international Preliminary Report on Patentability and Written Opinion, PCT/EP2014/071701, The International Bureau of WIPO, dated Apr. 21, 2016.

Harness, D., Patent Act 1977: Search Report under Section 17(5), Appl No. GB1317883.5, UK Intellectual Property Office, dated Mar. 28, 2014.

Lindner, Nora, International Preliminary Report on Patentability and Written Opinion, PCT/EP2014/071700, The International Bureau of WIPO, dated Apr. 26, 2016.

Versluis, Anton, International Search Report and Written Opinion, PCT/EP2014/071700, European Patent Office, dated Oct. 29, 2015.

* cited by examiner (a)

(b)

(c)

(d)

(e)

(f)

(a)

(b)

(c)

(d)

(e)

(f)

DRILLING APPARATUS

CROSS REFERENCE TO RELATED APPLICATIONS

This application is a U.S. National Stage Application filed under 35 U.S.C. § 371 and claims priority to International Application No. PCT/EP2014/071701, filed Oct. 9, 2014, which application claims priority to Great Britain Application No. 1318020.3, filed Oct. 11, 2013, the disclosures of which are incorporated herein by reference.

FIELD OF THE INVENTION

The present invention relates to high frequency percussion enhanced rotary drilling, and in particular to resonance enhanced drilling (RED). Embodiments of the invention are directed to apparatus and methods for resonance enhanced rotary drilling to improve drilling performance. Further embodiments of this invention are directed to resonance enhanced drilling equipment which may be controllable according to these methods and apparatus. Certain embodiments of the invention are applicable to any size of drill or material to be drilled. Certain more specific embodiments are directed at drilling through rock formations, particularly those of variable composition, which may be encountered in deep-hole drilling applications in the oil, gas mining and construction industries.

BACKGROUND

Percussion rotary drilling is known per se. A percussion rotary drill possesses a mechanism inducing an axial loading to the rotary drill bit. The mechanism provides impact forces on the material being drilled so as to break up the material which aids the rotary drill bit in cutting though the material.

Resonance enhanced rotary drilling is a special type of percussion rotary drilling in which there is an oscillator vibrating at high frequency so as to achieve resonance with the material being drilled. This results in an effective use of the mechanical energy at the rotary drill bit thus increasing drilling efficiency when compared to standard percussion rotary drilling.

U.S. Pat. No. 3,990,522 discloses a percussion rotary drill which uses a hydraulic hammer mounted in a rotary drill for drilling bolt holes. It is disclosed that an impacting cycle of variable stroke and frequency can be applied and adjusted to the natural frequency of the material being drilled to produce an amplification of the pressure exerted at the tip of the drill-bit. A servo-valve maintains percussion control, and in turn, is controlled by an operator through an electronic control module connected to the servo-valve by an electric conductor. The operator can selectively vary the percussion frequency from 0 to 2500 cycles per minute (i.e. 0 to 42 Hz) and selectively vary the stroke of the drill-bit from 0 to ⅛ inch (i.e. 0 to 3.175 mm) by controlling the flow of pressurized fluid to and from an actuator. It is described that by selecting a percussion stroke having a frequency that is equal to the natural or resonant frequency of the rock strata being drilled, the energy stored in the rock strata by the percussion forces will result in amplification of the pressure exerted at the tip of the drill-bit such that the solid material will collapse and dislodge and permit faster drill rates in the range 3 to 4 feet per minute.

There are several problems which have been identified with the aforementioned arrangement and which are discussed below.

High frequencies are not attainable using the apparatus of U.S. Pat. No. 3,990,522 which uses a relatively low frequency hydraulic periodic impactor, (described as an oscillator, but which does not oscillate in the strictly technical sense). Accordingly, although U.S. Pat. No. 3,990,522 discusses the possibility of resonance, it would appear that the low frequencies attainable by its impactor are insufficient to achieve resonance enhanced drilling through many hard materials.

Regardless of the frequency issue discussed above, resonance cannot easily be achieved and maintained in any case using the arrangement of U.S. Pat. No. 3,990,522, particularly if the drill passes through different materials having different resonance characteristics. This is because control of the percussive frequency and stroke in the arrangement of U.S. Pat. No. 3,990,522 is achieved manually by an operator. As such, it is difficult to control the apparatus to continuously adjust the frequency and stroke of percussion forces to maintain resonance as the drill passes through materials of differing type. This may not be such a major problem for drilling shallow bolt holes as described in U.S. Pat. No. 3,990,522. An operator can merely select a suitable frequency and stroke for the material in which a bolt hole is to be drilled and then operate the drill. However, the problem is exacerbated for deep-drilling through many different layers of rock. An operator located above a deep-drilled hole cannot see what type of rock is being drilled through and cannot readily achieve and maintain resonance as the drill passes from one rock type to another, particularly in regions where the rock type changes frequently.

Some of the aforementioned problems have been solved by the present inventor as described in WO 2007/141550. WO 2007/141550 describes a resonance enhanced rotary drill comprising an automated feedback and control mechanism which can continuously adjust the frequency and stroke of percussion forces to maintain resonance as a drill passes through rocks of differing type. The drill is provided with an adjustment means which is responsive to conditions of the material through which the drill is passing and a control means in a down-hole location which includes sensors for taking down-hole measurements of material characteristics whereby the apparatus is operable down-hole under closed loop real-time control.

US2006/0157280 suggests down-hole closed loop real-time control of an oscillator. It is described that sensors and a control unit can initially sweep a range of frequencies while monitoring a key drilling efficiency parameter such as rate of progression (ROP). An oscillation device can then be controlled to provide oscillations at an optimum frequency until the next frequency sweep is conducted. The pattern of the frequency sweep can be based on a one or more elements of the drilling operation such as a change in formation, a change in measured ROP, a predetermined time period or instruction from the surface. The detailed embodiment utilises an oscillation device which applies torsional oscillation to the rotary drill-bit and torsional resonance is referred to. However, it is further described that exemplary directions of oscillation applied to the drill-bit include oscillations across all degrees-of-freedom and are not utilised in order to initiate cracks in the material to be drilled. Rather, it is described that rotation of the drill-bit causes initial fractioning of the material to be drilled and then a momentary oscillation is applied in order to ensure that the rotary drill-bit remains in contact with the fracturing material. There does not appear to be any disclosure or suggestion of providing an oscillator which can import sufficiently high axial oscillatory loading to the drill-bit in order to initiate cracks in the material through which the rotary drill-bit is passing as is required in accordance with resonance enhanced drilling as described in WO 2007/141550.

Published international application WO2011/032874 by the present inventor looks to provide further improvements to the methods and apparatus described in the prior art. This application discloses a method for the controlling the frequency of the oscillator in the resonance enhanced rotary drill within a range defined by $U_s$ (the compressive strength of material being drilled). The method further involves controlling dynamic force (Fd) of the oscillator within a range defined by $U_s$. The $U_s$ is measured using a sensor.

A drilling module is disclosed in published patent application WO2012/076401, of the present inventor. The application discloses an apparatus for use in resonance enhanced rotary drilling, which comprises a load-cell for measuring static and dynamic axial loading and a load-cell for measuring static and dynamic axial loading. Typically a load-cell is positioned above a vibration isolation unit and a load-cell is positioned between a vibration transmission unit and the drill-bit. The load-cells are connected to a controller in order to provide down-hole closed loop real time control of the oscillator. However, whilst this system of control can be effective in some instances, further refinement of the sensing system is required in more sophisticated control systems.

The solutions described in WO2007/141550, US2006/0157280, WO2011/032874 and WO2012/076401 focus particularly on the nature of the oscillations of the resonator. These are only a subset of the degrees of freedom involved, and the methods and systems do not take into account other important aspects of RED, especially those which have been more recently developed. For example, the sensors and systems for estimation of material characteristics are too simple, for example relying on imprecise measurement of compressive strength, and not capable of accounting for other material characteristics at all. Consequently, there is a desire to make further improvements to the methods and apparatus described therein. It is an aim of embodiments of the present invention to make such improvements in order to increase drilling efficiency, increase drilling speed and borehole stability and quality, while limiting wear and tear on the apparatus so as to increase the lifetime of the apparatus. It is a further aim to provide an apparatus, and in particular a drilling module, which can deliver more precisely controlled resonance enhanced drilling, particularly when drilling through rapidly changing rock types.

SUMMARY

Accordingly, the present invention provides an apparatus for use in resonance enhanced drilling, which apparatus comprises a drilling module comprising a drill-bit, wherein the apparatus further comprises:
  a sensor for measuring one or more parameters relating to the interaction of the drill-bit and the material being drilled; and
  a sensor for measuring one or more motions of the drill-bit.

The drilling module is not especially limited, providing that it is a drilling module suitable for use in resonance enhanced drilling. Typically, in order to achieve resonance, the drilling module comprises an oscillator for imparting axial oscillatory loading to the drill-bit.

The sensors are not especially limited provided that they are capable of measuring the one or more parameters relating to the interaction of the drill bit and the material being drilled, and the one or more motions of the drill bit. The interaction of the drill bit with the material being drilled typically relates to impact characteristics, although other characteristics may be measured if desired. Typical impact characteristics include, but are not limited to, the acceleration, or acceleration profile, of the drill bit as it impacts and rebounds from the material (for example as a result of oscillatory motion) and/or the force of the drill bit on the material, either in the axial direction (for example as a result of force applied along the longitudinal axis of the drilling module to deliver a desired 'weight on bit'), or the rotary force (torque) between the drill-bit and the material (for example as deliberately applied to the drill bit by the module control system). The one or more motions of the drill-bit are not especially limited, and may include any and all degrees of freedom of the drill-bit. Typically, however, the motions include one or both of the velocity (or speed) of the drill-bit as it moves through the material being drilled, and the rotational motion of the drill-bit as it rotates and cuts at the face of the material being drilled. Typically these may be termed the axial and rotational motions respectively. The axial motion may include any motion that is not rotational, even if it comprises components that are not parallel to the longitudinal axis of the drilling module. The rotational motion may include any rotation, even if the rotation has a component that is not rotating about the longitudinal axis of the drilling module.

The capability of the apparatus to measure the interaction of the drill-bit and the material being drilled, and in addition to this to measure one or more motions of the drill-bit, enable a much more accurate real-time calculation to be made of the characteristics of the material being drilled (typically rock). Previously, it was not considered possible for such characteristics to be derived from such parameters, since there were no known accurate mathematical relationships between the parameters and the material characteristics. However, the inventor has found empirical models which enable such predictions to be made accurately, and the sensors are capable of measuring the information necessary for input into these models in real-time. The drilling module can therefore be more accurately controlled. This leads to significant improvements in drilling efficiency, drilling speed and borehole stability and quality, while limiting wear and tear on the apparatus so as to increase the lifetime of the apparatus.

BRIEF DESCRIPTION OF THE DRAWINGS

The invention will now be described in more detail by way of example only, with reference to the following Figures.

FIG. 16($b$) shows the phase portrait (curved line) with impact surface (straight line).

FIG. 25 shows membership functions of static load, b and amplitude of excitation, a.

DETAILED DESCRIPTION

Figure 1:
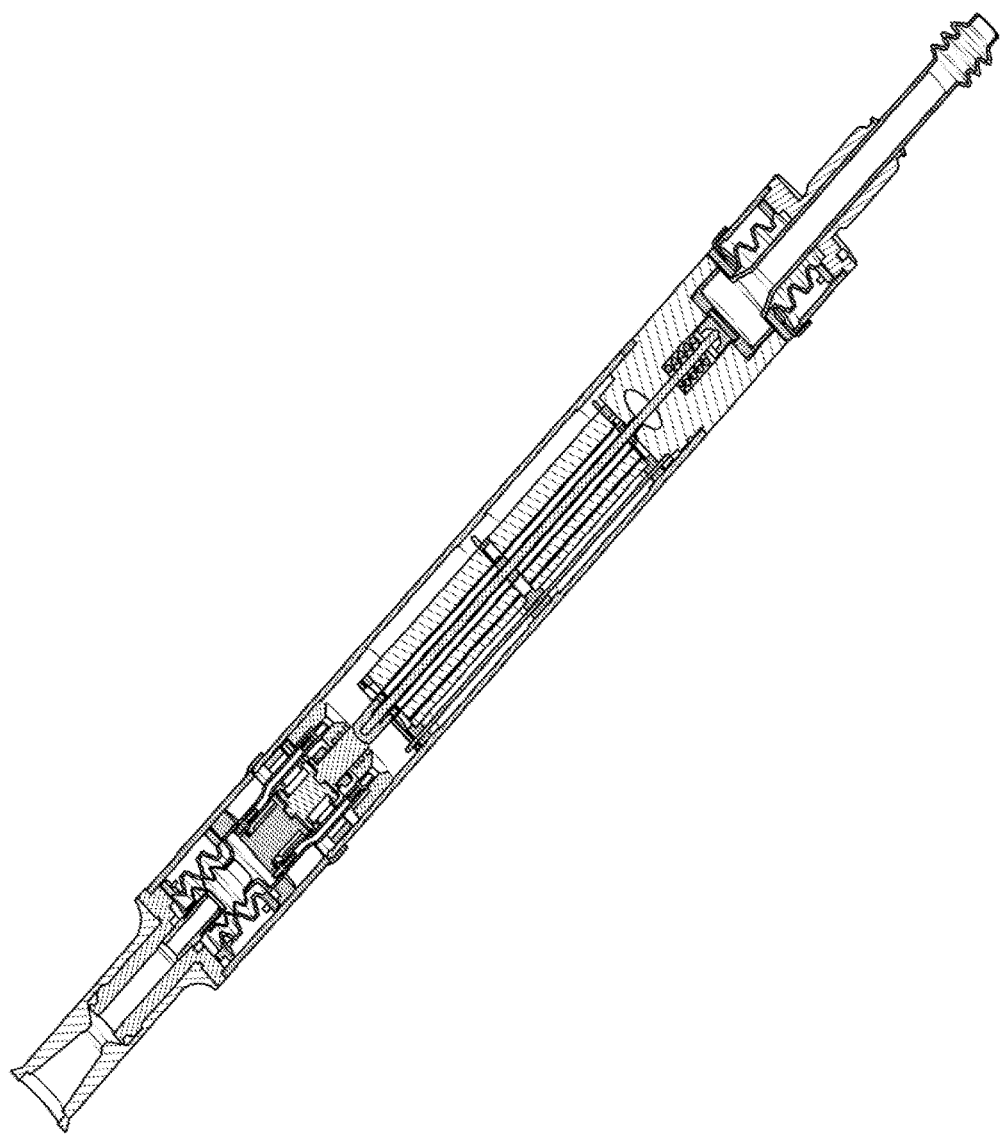
FIG. 1 shows a schematic of the drilling module of the invention comprising an actuation unit, a vibro-isolation unit, and an amplification unit. The actuation unit comprises a longer central portion, separated at the lower end from the drill bit by a vibro-transmission unit (and protected from the drill-bit torque by a torque restraint unit), and separated at the end distal from the drill bit by a vibro-isolation unit to protect the rest of the drill-string from damaging vibrations. The sensors of the invention may be placed on any one or more of these units, depending upon the design of the instrument and the sensitivity of the sensor.

As has been mentioned above, the present invention provides an apparatus for use in resonance enhanced drilling, which apparatus comprises a drilling module comprising a drill-bit, wherein the apparatus further comprises:
 a sensor for measuring one or more parameters relating to the interaction of the drill-bit and the material being drilled; and
 a sensor for measuring one or more motions of the drill-bit.

As alluded to, typically the one or more parameters relating to the interaction of the drill-bit and the material being drilled comprise one or more impact characteristics of the drill-bit with the material being drilled, and/or one or more forces between the drill bit and the material being drilled.

Whilst the sensors employed in the present invention are not especially limited, in typical embodiments, the apparatus comprises an accelerometer for measuring the one or more impact characteristics of the drill-bit with the material being drilled, and/or a load cell for measuring the one or more forces between the drill-bit and the material being drilled. Additionally, in further preferred embodiments, the apparatus comprises an eddy current sensor for measuring one or more motions of the drill-bit. Any appropriate accelerometer, load cell or eddy current sensor known in the art may be employed in the invention, provided that they are adapted to function in the drilling module under drilling conditions.

The drilling module itself is not especially limited, and any drilling module known in the art may be employed in the present invention, provided that it can be adapted to comprise the sensors necessary for imparting the module with the necessary control advantages. In typical embodiments, the drilling module further comprises:
- an actuation unit comprising an oscillator for applying axial oscillatory loading to the rotary drill-bit;
- a vibro-amplification unit for transmitting the oscillatory loading to the drill-bit; and
- a vibro-isolation unit for reducing or preventing oscillation beyond the drilling module.

A module which could be adapted for use in the present invention is described in WO2012076401. Appropriate vibration-amplification, vibration isolation and actuation units are described in detail therein and may be adapted for use in the present invention. Whilst the vibro-amplification unit is not especially limited, typically it comprises a spring system for transmitting the oscillatory loading to the drill-bit, and one or more torque restraint units for reducing or preventing torque from the rotary motion of the drill-bit transferring to the actuation unit.

As has been explained above, in typical embodiments the drilling module further comprises a control system for controlling one or more drilling parameters of the drilling module, wherein the control system employs information from the sensors to control the drilling parameters. Whilst this arrangement is preferred, it is possible in other arrangements that the control system is not part of the drilling module. Typically, but not exclusively, the control system comprises
- (a) a controller for determining one or more characteristics of the material to be drilled, and
- (b) a controller for determining one or more drilling parameters to apply to the drilling module;

wherein one or more of the controllers employs information from one or more of the sensors.

This control arrangement is particularly advantageous, since it allows significantly better control by providing much more accurate prediction of the characteristics of the material being drilled, than in previous apparatus.

In preferred embodiments, the sensors are capable of measuring one or more of the following drilling parameters:
- (a) axial drill force on the material being drilled (also called "weight on bit" (WOB), or "static force")
- (b) velocity or speed of the drill-bit and/or drilling module (also known as the "rate of progression" (ROP));
- (c) the acceleration of the drill-bit and/or drilling module;
- (d) the frequency of oscillation of the drill-bit and/or drilling module;
- (e) the amplitude of oscillation of the drill-bit and/or drilling module;
- (f) the oscillatory axial drill force on the material being drilled (also called the "dynamic force");
- (g) the rotary velocity or rotary speed of the drill;
- (h) the rotary force or torque of the drill;
- (i) fluid flow rate; and
- (j) relative displacement of the drill-bit.

The invention further provides a method of drilling, comprising operating an apparatus as defined above.

The invention still further provides a method of controlling a resonance enhanced rotary drill comprising an apparatus as defined above, the method comprising:
- (a) employing one or more initial characteristics of the material being drilled, and/or one or more initial drilling parameters to control the drilling module;
- (b) measuring one or more current drilling parameters using the sensors to obtain one or more measured drilling parameters;
- (c) employing the one or more measured drilling parameters to calculate one or more characteristics of the material being drilled;
- (d) employing the one or more calculated characteristics of the material being drilled, and/or the one or more measured drilling parameters, to calculate one or more calculated drilling parameters;
- (e) optionally applying the one or more calculated drilling parameters to the drilling module;
- (f) optionally repeating steps (b), (c) (d) and (e).

Typically, in step (d) one or more calculated drilling parameters from a previous iteration of the control process are employed as further input to determine the calculated drilling parameters.

Further typically, the drilling parameters comprise one or more of the following:
- (a) axial drill force on the material being drilled (also called "weight on bit" (WOB), or "static force")
- (b) velocity or speed of the drill-bit and/or drilling module through the material being drilled;
- (c) the acceleration of the drill-bit and/or drilling module through the material being drilled;
- (d) the frequency of oscillation of the drill-bit and/or drilling module;
- (e) the amplitude of oscillation of the drill-bit and/or drilling module;
- (f) the oscillatory axial drill force on the material being drilled (also called the "dynamic force");
- (g) the rotary velocity or rotary speed of the drill;
- (h) the rotary force or torque of the drill on the material being drilled;
- (i) fluid flow rate; and
- (j) relative displacement of the drill-bit.

In preferred embodiments, the characteristics of the material being drilled comprise one or more of:
- (a) the compressive strength of the material
- (b) the stiffness or the effective stiffness of the material;
- (c) the yield strength of the material;
- (d) the impact strength of the material;
- (e) the fatigue strength of the material;
- (f) the tensile strength of the material;
- (g) the shear strength of the material;
- (h) the hardness of the material;
- (i) the density of the material;
- (j) the Young's modulus of the material; and
- (k) the Poisson's ratio of the material.

Typically, but not exclusively, the one or more initial characteristics of the material being drilled in step (a) are obtained from empirical information, preferably from a database. Similarly, it is preferred that the one or more initial drilling parameters in step (a) are obtained from empirical information, preferably from a database.

Preferably, the one or more calculated characteristics of the material being drilled in step (c) are obtained using one or more models, preferably one or more empirical models and/or one or more mathematical models.

The present invention will now be described in more detail.

Resonance Enhanced Drilling

As has been emphasised above, the present invention is concerned with the control of a resonance enhanced drilling process or apparatus. The method of the invention may be applied to conventional RED methods, such as those disclosed in WO 2007/141550 and WO 2011/032874. In such known methods, typically the parameters of motion of the oscillator are controlled, based on a feedback mechanism which uses sensors to directly determine the compressive strength of the rock being drilled. In the present method, a much more sophisticated feedback is employed, as described above.

Generally, in known RED methods, during operation, the rotary drill-bit is rotated and an axially oriented dynamic loading is applied to the drill-bit by an oscillator to generate a crack propagation zone to aid the rotary drill bit in cutting though material. In known methods, the oscillator is typically controlled as described in WO 2011/032874. In these methods, the ranges for the frequency and dynamic force are based on the analysis provided below. In the present invention, the details below represent a useful guide as a process to which the more sophisticated control process may be applied.

The compressive strength of the formation gives a lower bound on the necessary impact forces. The minimum required amplitude of the dynamic force has been calculated as:

$$F_d = \frac{\pi}{4} D_{eff}^2 U_s.$$

$D_{eff}$ is an effective diameter of the rotary drill bit which is the diameter D of the drill-bit scaled according to the fraction of the drill-bit which contacts the material being drilled. Thus, the effective diameter $D_{eff}$ may be defined as:

$$D_{eff} = \sqrt{S_{contact}} D,$$

where $S_{contact}$ is a scaling factor corresponding to the fraction of the drill-bit which contacts the material being drilled. For example, estimating that only 5% of the drill-bit surface is in contact with the material being drilled, an effective diameter $D_{eff}$ can be defined as:

$$D_{eff} = \sqrt{0.05} D;$$

The aforementioned calculations provide a lower bound for the dynamic force of the oscillator. Utilizing a dynamic force greater than this lower bound generates a crack propagation zone in front of the drill-bit during operation. However, if the dynamic force is too large then the crack propagation zone will extend far from the drill bit compromising borehole stability and reducing borehole quality. In addition, if the dynamic force imparted on the rotary drill by the oscillator is too large then accelerated and catastrophic tool wear and/or failure may result.

Parameters

As has been made clear above, an important part of the present apparatus is the improved control process which it enables, and in particular the modelling of drilling parameters, using measured drilling parameters and modelled material characteristics as input.

To adequately model the influence of the various drilling parameters on RED, a physical model that takes into account the interaction of the drilling module (especially the drill-bit) and the material (e.g. rock) is required. Such a model should preferably not only capture the material fragmentation process but also simulate the drilling dynamics of the system. This can be accomplished, as exemplified below, provided a mechanical response of the material is adequately modelled. These responses can then be used in the drilling parameter calculation controller, for example to build up a suitable rule-base and inference mechanism for in a fuzzy logic process.

The performance of Resonance Enhanced Drilling (RED), like any other method of borehole creation, depends on the input parameters applied. For example, the weight on bit (WOB), rotary speed, force amplitude and frequency of excitation are expected to have significant impact on the on the rates of progression and percentage improvement over conventional drilling that is achieved. An understanding of how these parameters individually influence the outcome of RED is important to the determination of the combination required for the best performance.

The inventor has performed a simulation based on experimentally determined properties for sandstone. The drill-bit and the remainder drill-string were considered rigid elements.

The results obtained for the influence of the WOB, rotary speed, amplitude and frequency of excitation were investigated and observation compared with the earlier experimental studies.

Influence of WOB

The weight on bit (WOB) provides to the force necessary for rock fragmentation in conventional rotary drilling. However, in RED the force is a combination of a static force (or WOB) and a harmonic force. It is therefore necessary to understand the effect of the WOB on the process. To investigate the its influence on the performance of the RED, finite element simulations were conducted. The material properties, rotary speed, amplitude and frequency of excitation were kept constant while the static force can vary between a minimum and a maximum, such as from 0.75 to 2 kN.

Figure 28:
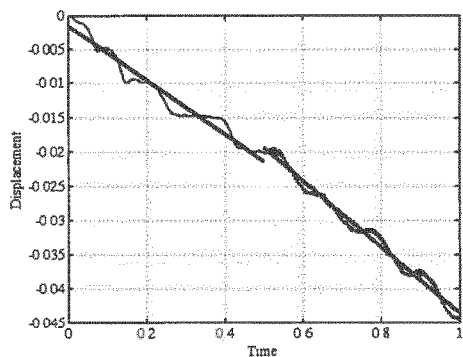
FIG. 28 shows time histories of the displacement at (a) 0.75 kN, (b) 1.0 kN, (c) 1.25 kN, (d) 1.5 kN, (e) 1.75 kN and (f) 2.0 kN static load and 2.5 kN dynamic force amplitude. (top left line conventional drilling while bottom right line is RED).
Figure 28:
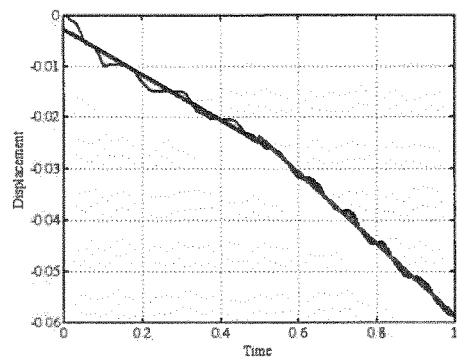
Figure 28:
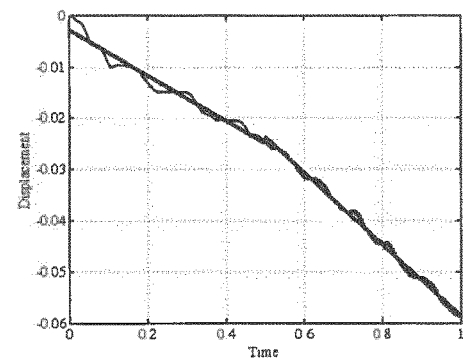
Figure 28:
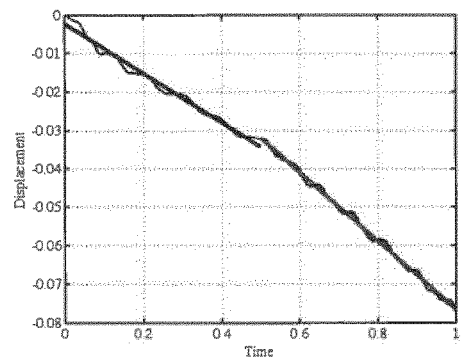
Figure 28:
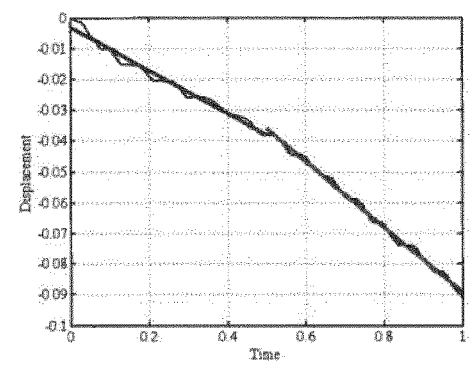
Figure 28:
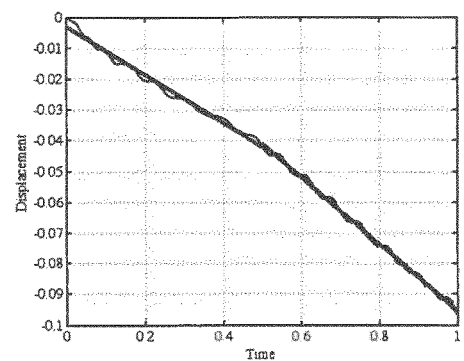

FIG. 28 shows the time histories of the displacement of the drill-bit for each load used. It is observed that gradient of the times histories during the conventional drilling phase of the simulation was always lower to that experienced during the RED. This is qualitatively similar to the experimental outcomes in the laboratory.

Figure 29:
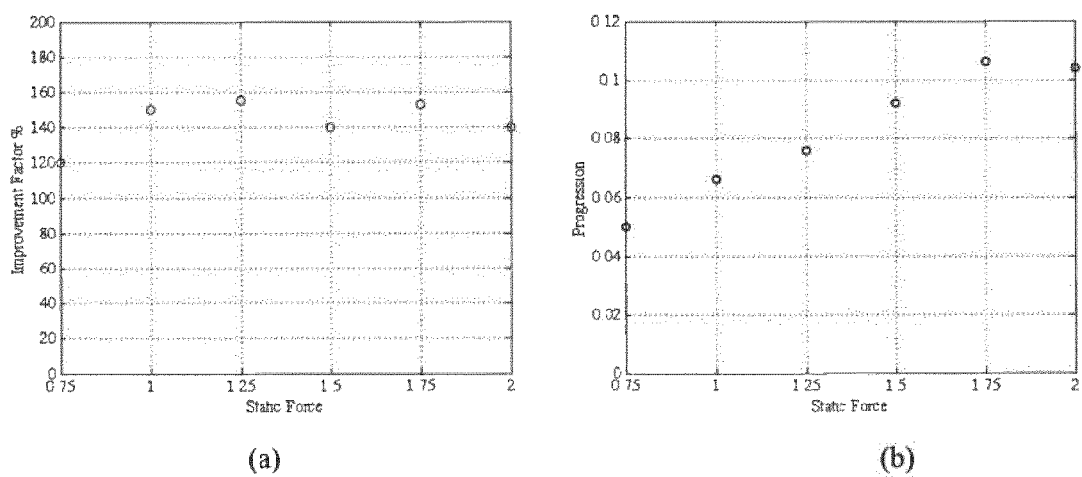
FIG. 29 shows the relation between (a) improvement factor and (b) progression and static force for dynamic amplitude of 2.5 kN.

In FIG. 29(a) the variation of the improvement factor for RED is depicted. The value obtained was fairly constant for all WOB used. It is worth mentioning that this does not correspond to experiments. This is due to the fact that real rocks used in the experiment are heterogeneous, while the rock in this model has homogenous properties. Hence a fairly constant value is expected to be obtained for the improvement factor. FIG. 29(b), is a graphical representation of the relationship between the WOB and the progression for different WOB. It is observed that while the progression increases with increasing WOB till the 1.75 kN after which a drop is observed.

Influence of Amplitude of Excitation

The energy available when the drill-bit impacts the rock in RED is a function of the amplitude of the harmonic excitation. However, there is a constraint imposed on the maximum value of attainable due to power available to the RED actuator. It is thus useful to establish how it influences the overall performance of the drilling process. To study the effect of changes to the amplitude, three simulations were carried out at different force amplitudes while keeping the other WOB (static force) and other drilling parameters constant.

Figure 30:
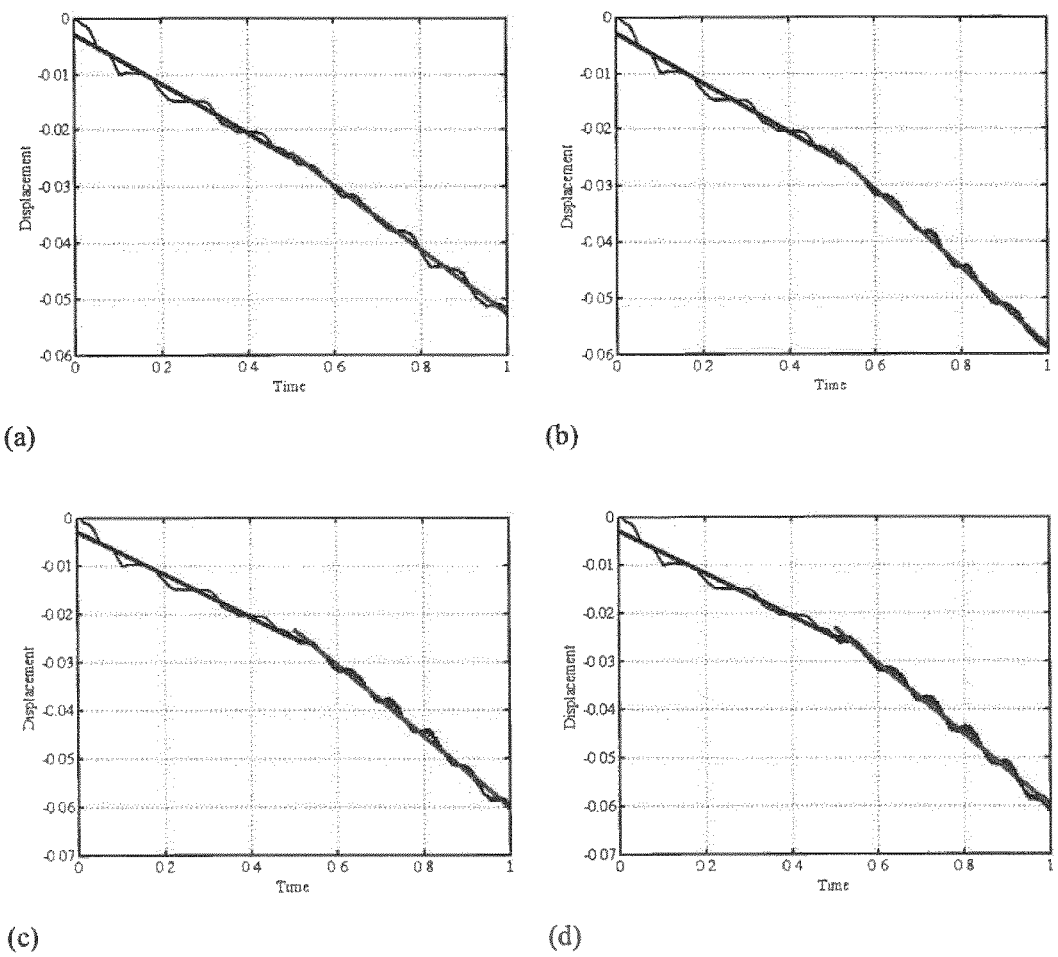
FIG. 30 shows time histories of the displacement at (a) 1.5 kN, (b) 2.5 kN, (c) 3.5 kN and (d) 5 kN amplitude of excitation and static load of 1 kN. (the upper left line is conventional drilling while the lower right line is RED).

FIG. 30 presents the time histories of the displacement of the drill-bit during the convention drilling and RED. It is noted that average penetration rates obtained during the RED phase was always greater than what was achieved during the conventional drilling phase of the simulation.

Figure 31:
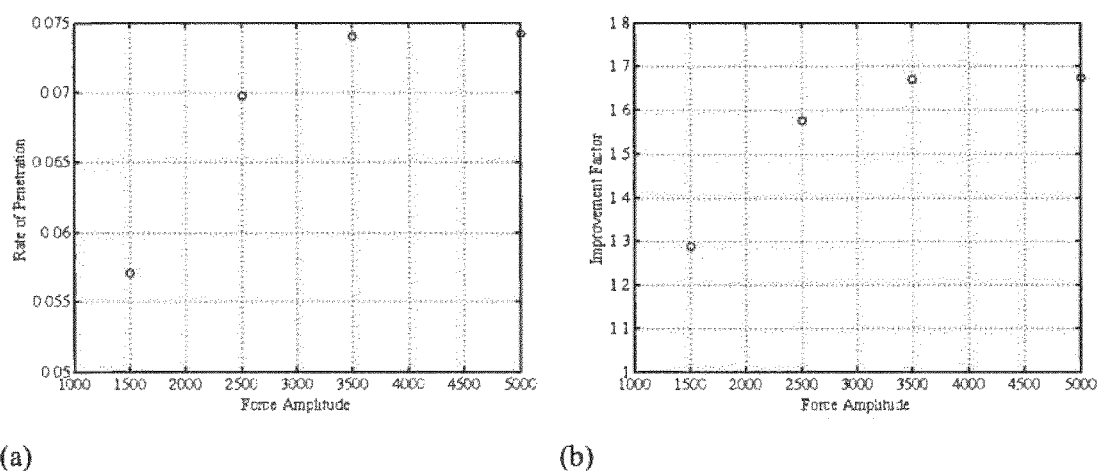
FIG. 31 shows the variation of amplitude of excitation and (a) rate of penetration and (b) improvement factor.

In FIG. 31(a), the graph of the progression rates against the amplitude of excitation is presented. The rate of progression increases with amplitudes and the same can be said of that the improvement factor (FIG. 31(b)). The observations agree with results obtained from experiments.

Influence of Frequency of Excitation

The frequency of excitation of the dynamic force determines the rate of energy available for rock fragmentation per unit time. Consequently, the understanding of how the frequency affects the efficiency of RED would assist in selecting the best value to use in a drilling operation.

Figure 32:
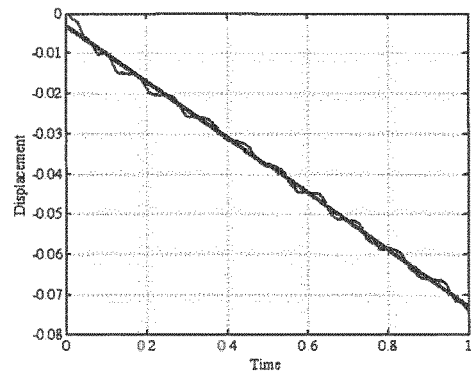
FIG. 32 shows time histories of the displacement at (a) 150 Hz, (b) 180 Hz, (c) 190 Hz, (d) 200 Hz and (e) 210 Hz frequency of excitation and static load of 1.75 kN. (upper left line is conventional drilling while lower right line is RED).
Figure 32:
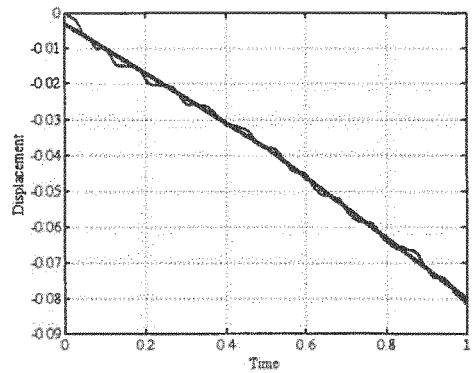
Figure 32:
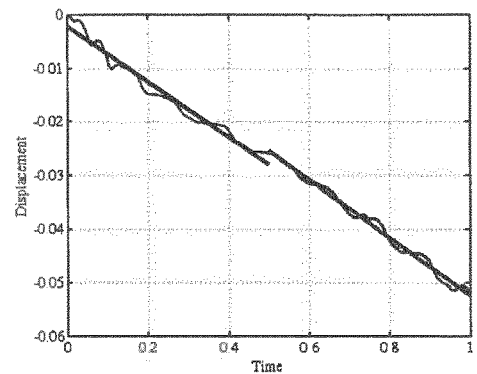
Figure 32:
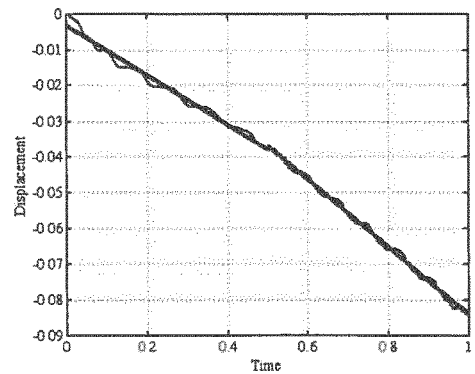
Figure 32:
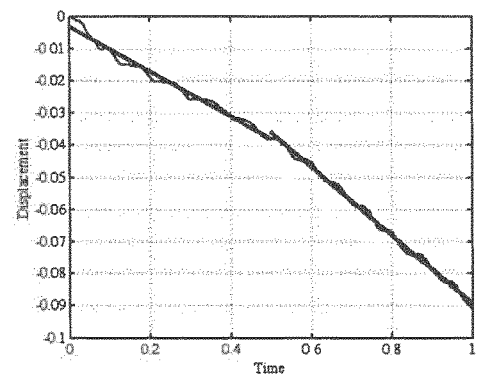
Figure 32:
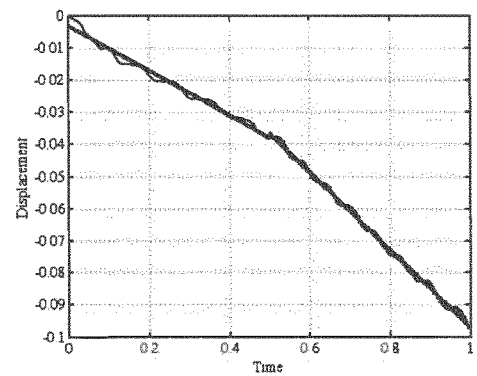

The influence of the frequency on performance was also studied using the same finite element model. The value of the frequency was varied while other model parameters were held constant. The simulation was conducted from 150, 180, 190, 200 and 210 Hz. The results are depicted in terms of the time histories of displacement of the drill-bit in the FIG. 32.

Figure 33:
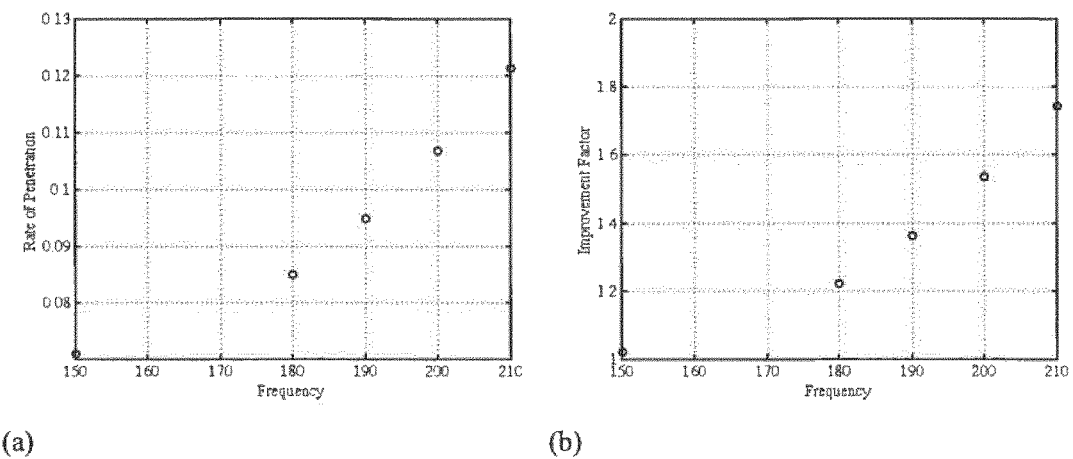
FIG. 33 shows the variation of frequency of excitation and (a) rate of penetration and (b) improvement factor.

FIG. 33(a) shows that the relationship between the frequency and the rate of penetration, while in FIG. 33(b) the improvement factor obtained for the different speed are graphically presented. The penetration rates increased with increasing frequency for the range used. It is also observed that gradient of the graph became significantly higher beyond 180 Hz. This suggests that if simulation for higher frequencies were carried out, it may be possible to find the optimum value need for best performance. Similar results were obtained for the improvement factor as shown in FIG. 33(b). These types of the outcomes were observed in RED experiments.

Influence of Rotary Speed

The rotary speed of a drill-string contributes to the efficiency of the drilling process. It is known that the rotary speed plays an important role in rock fragmentation and cuttings removal in conventional rotary drilling. It is useful to study its influence on the performance of RED.

A study was conducted for rotary speed varying from 30 rpm to 120 rpm in steps of 30 rpm. The results of the analysis are graphically presented in FIG. 34 in terms of the time histories of the displacement of the drill-bit. The average rate of penetration for the RED phase always exceeded that for conventional rotary drilling.

Figure 34:
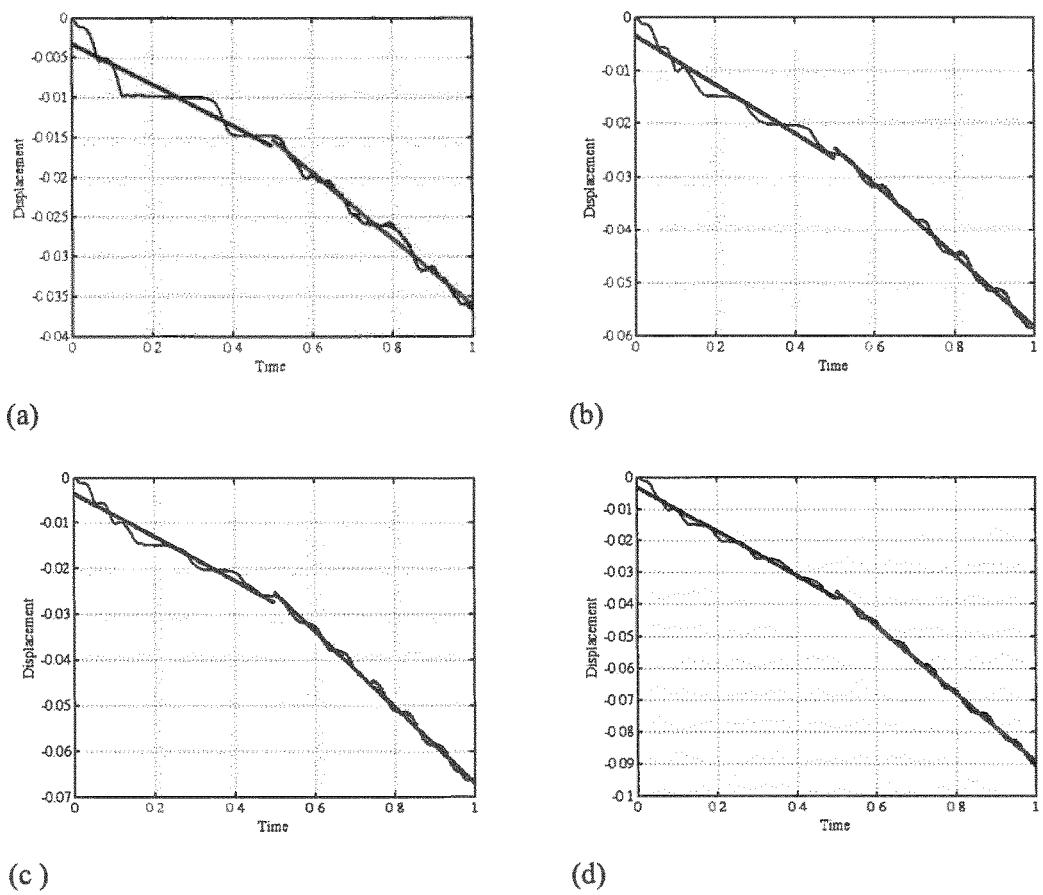
FIG. 34 shows time histories of the displacement at (a) 30 rpm, (b) 60 rpm, (c) 90 rpm and (d) 120 rpm at frequency of excitation 200 Hz and static load of 1.75 kN. (upper left line is conventional drilling while lower right line is RED).
Figure 35:
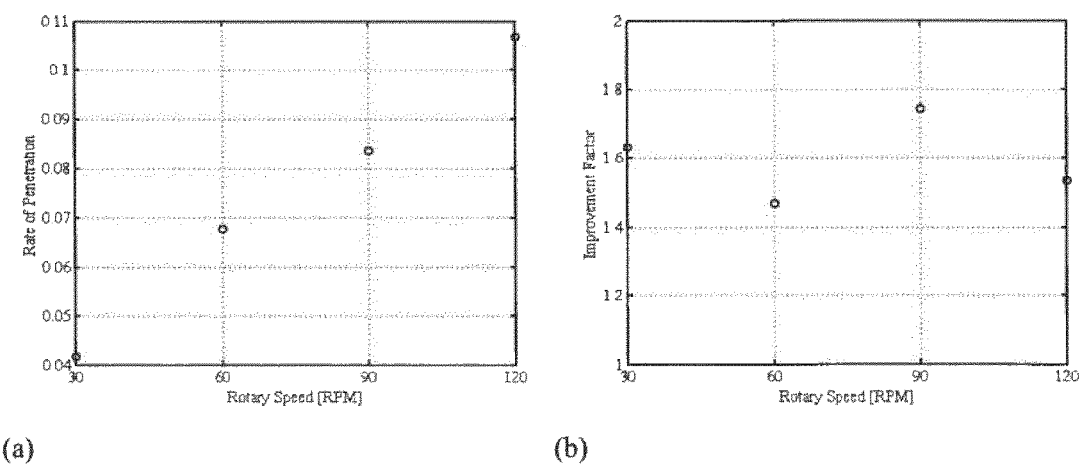
FIG. 35 shows the variation of rotary speed and (a) rate of penetration and (b) improvement factor.

From FIGS. 34 and 35(a), it is also noted that as the drilling assembly moved faster with increasing rotary speed both for RED and conventional drilling. FIG. 35(b) is a graphical summary of the improvement factor obtained for the various speeds. The improvement factor is observed to remain fairly constant for all rotary speeds applied. These results agree with that obtained from experiments.

Summary of Parameter Influence

In particular, it has been shown that the WOB and dynamic force both contribute to the force required for rock fragmentation. As such, their respective amounts affect the efficiency of the drilling process. The WOB has been shown to have an optimal value for best performance to be achieved. Increasing the amplitude of excitation produced increases penetration rates and improvement factors for RED.

The data show that the frequency of excitation plays a significant role in the amount of energy per unit time available for rock fragmentation. In addition, the rotary speed has been shown to determine the rate of material removal from the face of the drill-bit. The rate of penetration has been shown to increase with increasing rotary speed.

All results obtained from the finite element simulations conducted were qualitatively similar to those observed from RED experiments.

In summary, to adequately model the influence of the various drilling parameters on RED, physical (or empirical) models that take into account the drilling module (e.g. drill-bit) and material (e.g. rock) interactions have been developed. These models have been shown to be suitable in the determination of the best drilling parameters for rocks and other materials and may be employed in the controller as part of the control process of the invention. The models may be used to build up a suitable rule-base and inference mechanism in a fuzzy logic controller for calculating drilling parameters, or may be used in other control strategies.

Control System

Figure 4:
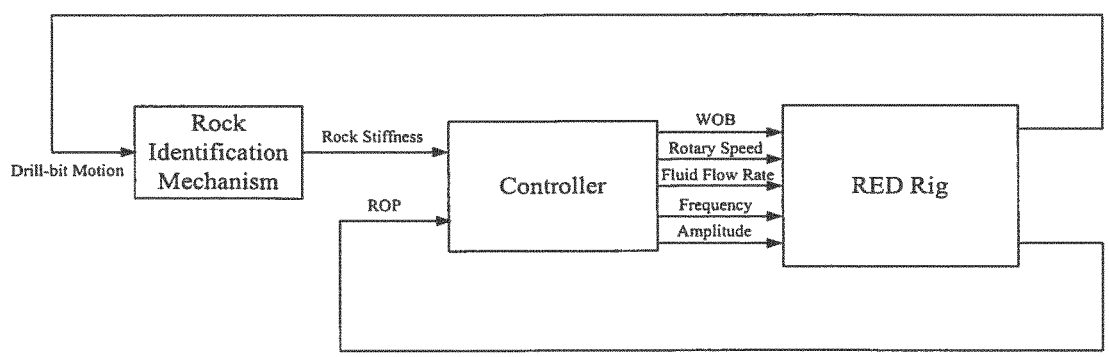
FIG. 4 shows a schematic representation of a control system of the present invention. In this scheme, the controller for calculating the characteristics of the material being drilled is labelled 'Rock Identification Mechanism', the controller for calculating the drilling parameters is labelled 'Controller', and various exemplary material characteristics and drilling parameters are shown as being employed in the control method. The sensors used in the invention typically provide information for both of these controllers.

An example of a control system according to the present invention is shown in FIG. 4. In this scheme, the controller for calculating the characteristics of the material being drilled is labelled 'Rock Identification Mechanism', the controller for calculating the drilling parameters is labelled 'Controller', and various exemplary material characteristics and drilling parameters are shown as being employed in the control method.

Controller for Calculating Drilling Parameters

A simulation study by the inventor has demonstrated that the optimum amplitude of excitation and WOB which gave the best penetration rate varied depending on rock stiffness. The fuzzy control strategy of the present invention is preferred to adjust the optimal frequency and amplitude (or other drilling parameters) of the RED drilling module for different rock (or other material) conditions.

Figure 21:
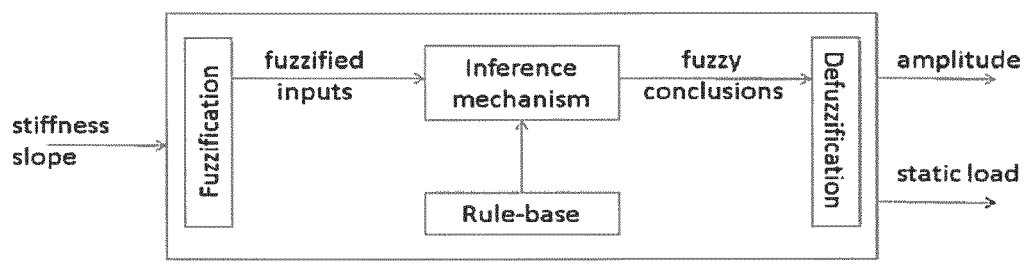
FIG. 21 shows a schematic of a fuzzy control algorithm.

A schematic of the proposed method is presented in FIG. 21, which contains fuzzification, an inference mechanism, a rule-base, and defuzzification. Fuzzification is a process that converts the crisp inputs into linguistic terms, and then put them in the inference mechanism based on a predefined rule-base. Later on, the linguistic decision obtained from the inference mechanism is converted to crisp control parameters for the drifting oscillator. As shown in FIG. 21, the present control system has at least one input (for example stiffness slope, as in the Figure) and at least one output (two outputs in the Figure, which in this example are amplitude of excitation and static force).

Figure 22:
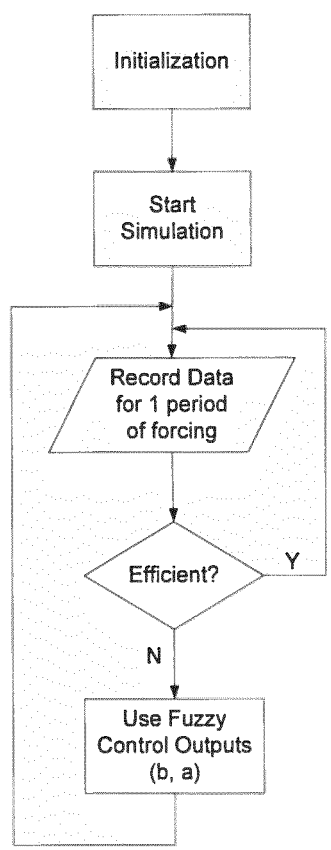
FIG. 22 shows a flow chart of the present fuzzy control process.

A flow chart of the present control process is given in FIG. 22. As shown from this graph, the process begins with initialization and recordal of the data for one period of forcing once simulation starts. Then the fuzzy system evaluates whether the current control parameters (b and a) are the best ones that can produce the best efficiency under current stiffness condition. If so, the system will continue to use the current control parameters; if not, the crisp control parameters calculated by the fuzzy control system (the updated, or calculated, drilling parameters) will be adopted.

Fuzzification

Figure 23:
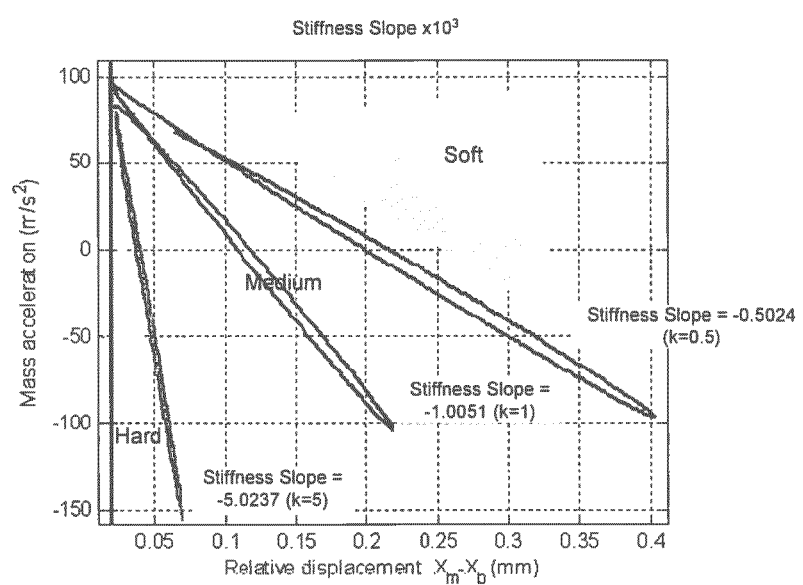
FIG. 23 shows a schematic of fuzzification of stiffness slope.
Figure 24:
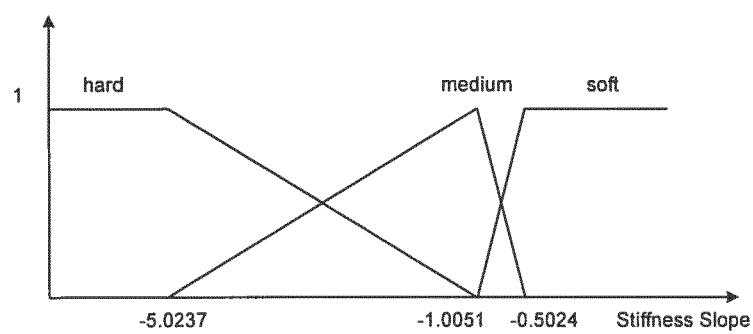
FIG. 24 shows a membership function of stiffness slope.

The fuzzy controller has at least one input signal (such as stiffness slope in this example). The inference mechanism will choose a control rule based on the fuzzified input. The fuzzification of stiffness slope is presented in FIG. 23. As seen in FIG. 23, a stiffness slope which is larger than −0.5024 is defined as "soft", a stiffness slope between −0.5024 and −5.0237 is defined as "medium", and the stiffness slope which is less than −5.0237 is defined as "hard". A summary of the fuzzification is given in Table 1, and the membership function of stiffness slope is given in FIG. 24.

TABLE 1 fuzzification of stiffness slope

| Stiffness slope (SS) | |
| --- | --- |
| "soft" | SS > −0.5024 |
| "medium" | −5.0237 < SS < −0.5024 |
| "hard" | SS < −5.0237 |

Rule-Base

Since it is assumed that the static load is fixed for this example, the objective of the fuzzy controller may then be converted to find (for example) the optimal amplitude of excitation which generates the best average progression. Mamdani model-based fuzzy control rules for this example are given as follows:

If stiffness is SOFT, WOB is LARGE and amplitude of excitation is SMALL;
If stiffness is MEDIUM, WOB is MIDDLE and amplitude of excitation is MIDDLE;
If stiffness is HARD, WOB is SMALL and amplitude of excitation is LARGE.

Other rules for other relationships between parameters may be applied as desired. When there are several inputs, different rules may be applied for different input parameters. Similarly, when optimization of different parameters is required, further different rules may be applied. The inference mechanism may be adapted to ensure that the correct rules are matched with the inputs employed and the parameters being optimized.

Defuzzification

Figure 25:
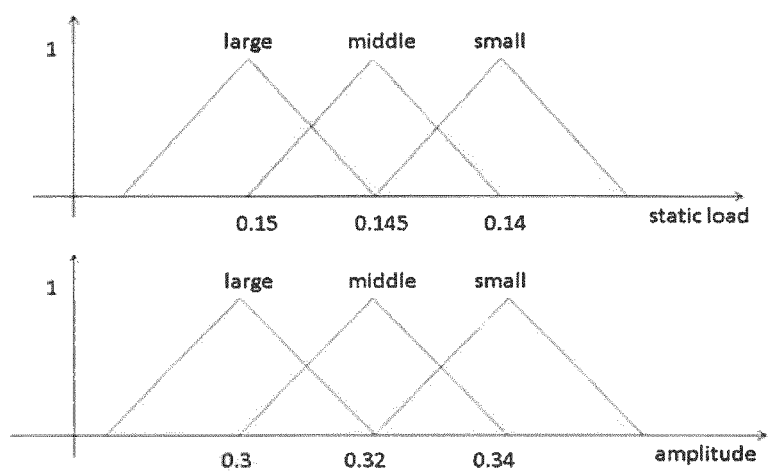

FIG. 25 shows the membership functions of static load and amplitude of excitation for defuzzification of fuzzy conclusions from an inference mechanism. It is particularly preferred to use centre of gravity methods through which a crisp output can be calculated using the centre of total area of each implied fuzzy set.

Numerical Results

Figure 26:
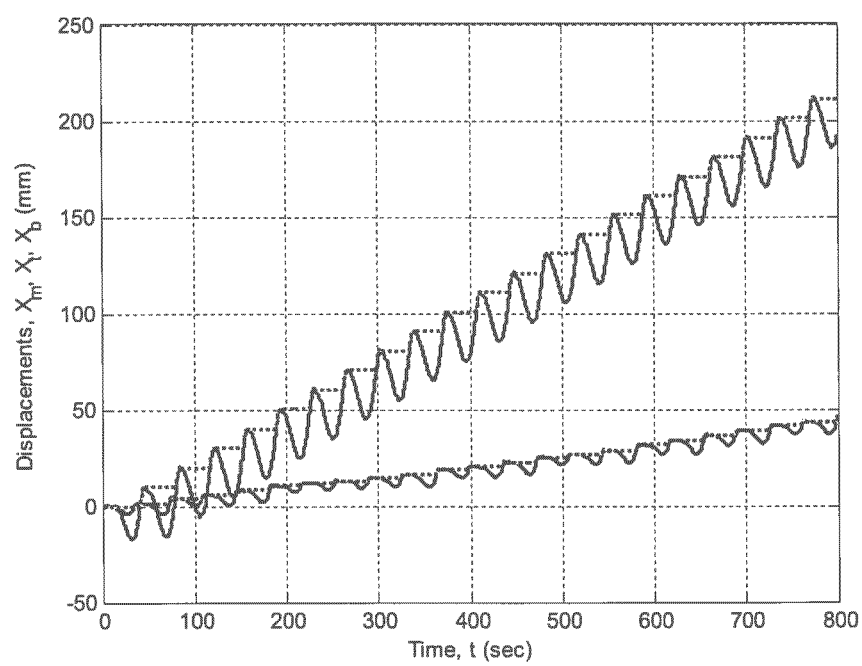
FIG. 26 shows a time history of displacements calculated for $m=1$, $P_f=1$, $\xi=0.05$, $\omega=0.1$, $g=0.02$, $\varphi=\pi/2$, $k=3$, $b=0.13$, $a=0.2$ (lower lines) and $b=0.1432$, $a=0.3126$ (upper lines).
Figure 27:
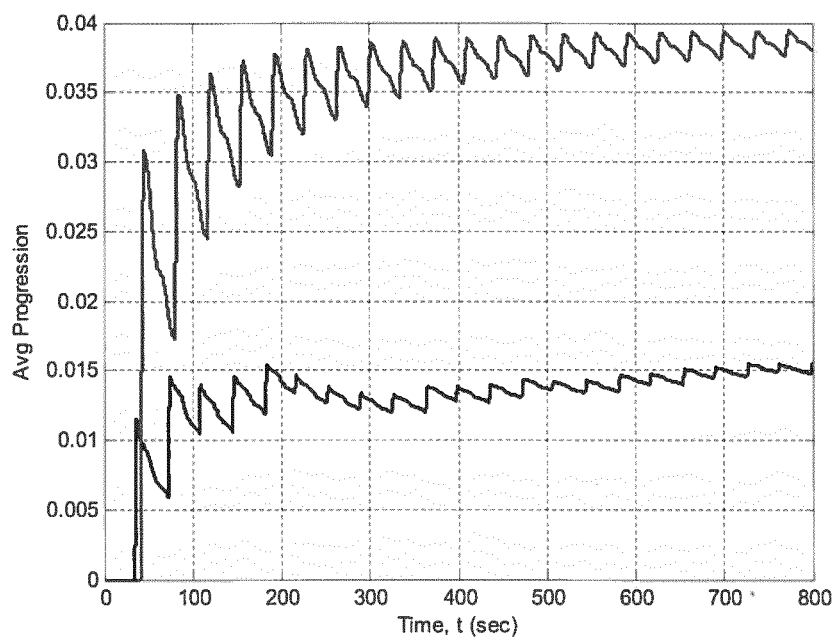
FIG. 27 shows a time history of average progressions calculated for $m=1$, $P_f=1$, $\xi=0.05$, $\omega=0.1$, $g=0.02$, $\varphi=\pi/2$, $k=3$, $b=0.13$, $a=0.2$ (lower lines) and $b=0.1432$, $a=0.3126$ (upper lines).

The inventor carried out simulation studies for the proposed fuzzy controller by using the following parameters: m=1, $P_f$=1, $\xi$=0.05, $\omega$=0.1, g=0.02 and $\varphi$=$\pi$/2. The simulation results using k=3, b=0.13 and a=0.2 are shown in FIG. 26, which are indicated by the lower set of lines. The fuzzy controller indicates the optimum parameters are b=0.1432 and a=0.3126, and the simulation results using the optimum parameters are shown in FIG. 26 which are indicated by the higher set of lines. It is clearly seen that the displacement using the optimum parameters is significantly increased and the improved average progression using the optimum parameters can be seen in FIG. 27.

Controller for Calculating Characteristics of Material being Drilled

The controller for calculating characteristics of material being drilled will now be described in more detail. The current control systems and methods may be employed in many types of drilling, and are therefore not limited to large scale drilling, such as drilling through rock. However, typically the invention is well suited to large scale drilling, such as rock drilling in the mining and oil industries. Therefore, the material being drilled is typically a type of rock. In the following, references to rock may nevertheless also be taken to be applicable to other materials too.

Figure 5:
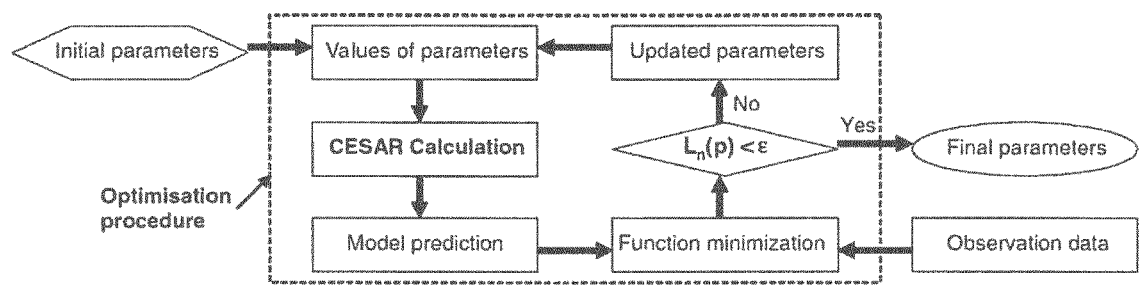
FIG. 5 shows a procedure for signal identification in a controller for calculating or identifying characteristics of the material to be drilled (e.g. a rock identification procedure).

When the material is rock, or any other material, the material identification problem can be formulated in terms of mathematical optimization: Given an observed signal x(t) (obtained from drilling measurements) it is useful to find a model function y(t,p) (p being a parameter of the model) such that the error:

$$L_n(p) = \frac{1}{t_f - t_0} \int_{t_0}^{t_f} \|x(t) - y(t, p)\| dt$$

is minimum. To solve this problem, several algorithms are available, for example the one shown in FIG. 5 based on inverse analysis. However, the successful application of algorithms of this kind requires the existence of robust mathematical models describing the phenomena to be studied, in such a way that the signals y(t, p) can be predicted.

A problem of previous control systems, and a problem underlying the present invention, was that up to present there is no accurate model in physics available to describe the particular characteristics of the rock formations subjected to a drilling process. Accordingly, the inventor determined to apply a different approach. Alternative avenues explored by the inventor include the following empirical models:

Genetic algorithms—based on the genetic pool transition generation after generation, derived from Darwin's evolution theory.

Ant colony algorithms—based on the behaviour of insects.

Tabu research—exploring the local neighbourhood of the desired critical value.

Particle swarm optimization—based on the social behaviour of a group such as birds flying in the sky, or people looking for an exit inside a building.

Artificial neural networks—popular for pattern recognition problems, where the method mimics the learning process of the central nervous systems.

All of these approaches provide useful alternatives to a physics theory for the system. In general, it is preferred in the present invention that such an alternative empirical model is employed. This may or may not be a mathematical model.

Other potentially useful models for identifying material (or rock) characteristics include impact based identification, penetration based identification and NARMAX models.

Neural Network Based Identification

Figure 6:
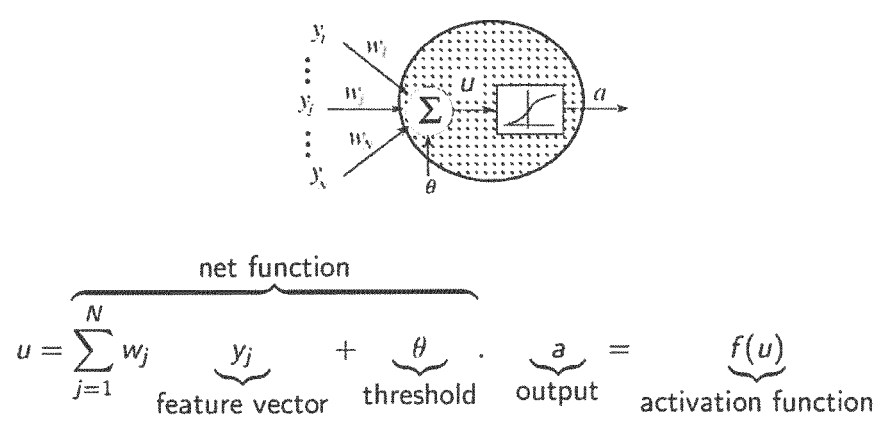
FIG. 6 shows a neuron model for an Artificial Neural Network (ANN).

In the present invention, whilst any of the above empirical models (or any other suitable model) may be employed, Artificial Neural Networks (ANN) are the most preferred for solving the material characteristics (rock characteristics) identification problem. They are particularly useful if the stiffness of the material is one of the parameters to be employed (although they are also useful for other parameters too). An ANN presents the significant advantage that no explicit mathematical model (or physics model) of the phenomenon in question is required. The key point of ANN is to carry out an appropriate learning process for the chosen network. A neuron model for an ANN is shown in FIG. 6.

An ANN is a general mathematical computing paradigm that models the operations of biological neural systems (e.g. learning, classifying, and pattern recognition). The main idea is to define suitable features vectors (measures) that capture the characteristics of the process to be studied, in this case the material (or rock) characteristics under drilling conditions. Once a set of feature vectors has been defined, the ANN is subjected to a learning process, in which the ANN will adjust its coefficients in order to identify correctly the rock properties. In this stage, it is important to have a sufficiently large range of training samples, in such a way that they are representative of the drilling conditions to be expected in the real applications.

In the present invention, there are a number of signals available which can be employed for an ANN identification process. In particular, the position and acceleration of the drill-bit. This allows one to define various features measures, (such as power, peaks, Fourier coefficients, etc.) taken for both position and acceleration signals. This may be illustrated by an experiment. Consider a set of training signals generated under the following drilling conditions:

TABLE 2

Parameters of the experimental data for ANN training.

| Rock | Drill Bit | Frequency (Hz) | Amplitude (V) | WOB (kN) |
|---|---|---|---|---|
| Granite | 3⅞" PDC | 178.83 | 200 | 1.5 |
| Sandstone | 3⅞" Varel 4919 | 178.22 | 180 | 3.5 |

Figure 7:
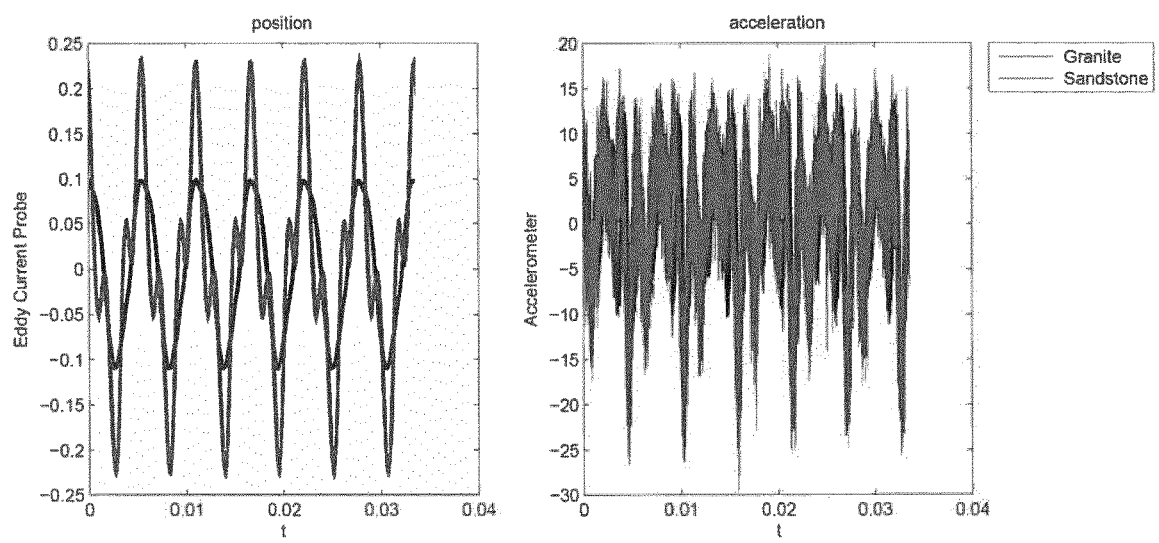
FIG. 7 shows the training signals (position and acceleration signals) generated under the certain drilling conditions, for granite and sandstone.

The training signals (position and acceleration signals) generated under the above mentioned drilling conditions are shown in FIG. 7, for granite and sandstone.

Figure 8:
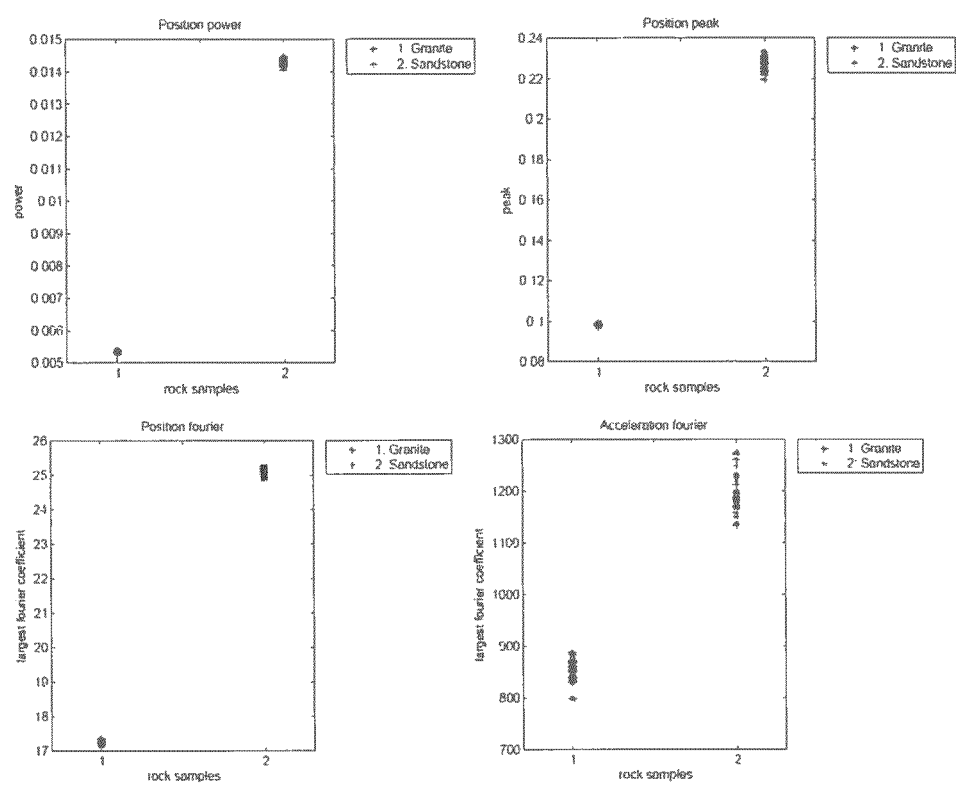
FIG. 8 various measurements taken for the ANN training (position and acceleration signals) are shown.

In FIG. 8, various measurements taken for the ANN training are shown. One key aspect of this approach is to take measures that are able to distinguish the characteristics one is interested in, which in this example is the rock type (granite/sandstone). As can be seen in the Figure, the chosen measures effectively accumulate for each of the rock types, thus giving an indication of their capability to identify what type of rock is being drilled.

Figure 9:
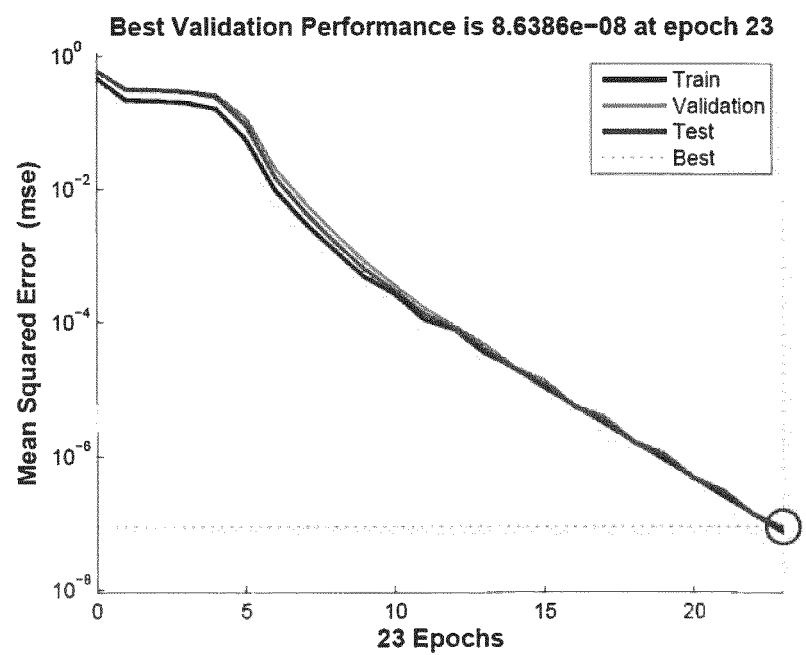
FIG. 9 shows the performance of the ANN training process.

With these measurements it is possible to carry out the learning algorithm (for which the Matlab ANN toolbox was used) choosing the supervised learning as implementation option. The performance of this procedure can be observed in FIG. 9. As can be seen, the algorithm converges remarkably fast, which means that the underlying problem is well-posed. This is a very important aspect to consider, since the well-posedness of the problem is intimately related to the robustness of the identification technique. This is important in view of the possible harsh conditions under which the rock formations have to be carefully identified. In this regard, the method shows very good convergence characteristics, which is an indication that this technique is a great improvement for calculating real drilling conditions.

Once the ANN has been trained, one may test the network in order to verify its identification capabilities. This can be done by dividing the sample data into two groups: training and testing, in such a way that all the process is carried out with the same set of experimental data. However, in order to illustrate the robustness and effectiveness of the proposed identification technique, a separate set of experimental data was used as detailed below in Table 3:

TABLE 3

Parameters of the experimental data for ANN testing.

| Rock | Drill Bit | Frequency (Hz) | Amplitude (V) | WOB (kN) |
|---|---|---|---|---|
| Granite | 2¾" PDC | 178.22 | 195 | 1.6 |
| Sandstone | 3⅞" Varel 4885 | 178.22 | 180 | 3.5 |

As can be seen, the parameters for the testing data differ from those of the training data, but of course they are reasonably similar. Thus, using this new set of experimental data one may take position and acceleration as main signals and obtain the measures defined previously in order to test the trained network.

Figure 10:
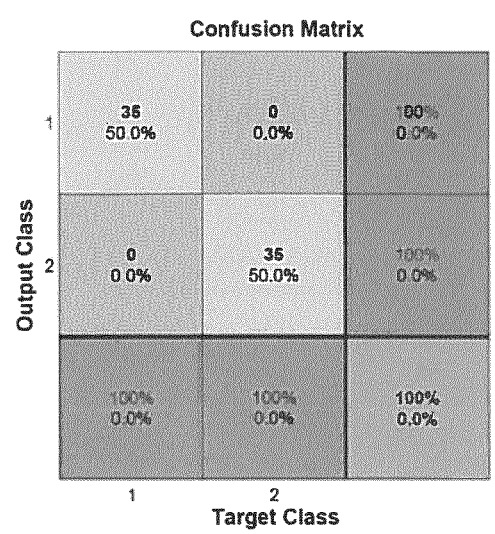
FIG. 10 shows an identification matrix.

The result can be seen in FIG. 10. This is the so-called confusion matrix which shows the absolute number of samples and their percentage corresponding to correctly and non-correctly identified signals. In this case, it can be seen that all the samples accumulate in the diagonal of the confusion matrix, meaning that samples corresponding to class 1 (granite) have been identified by the network as belonging to class 1 and so on. Therefore, this method can be applied and extended in order to implement the rock identification controller shown in FIG. 5.

Impact-Based Identification

Figure 11:
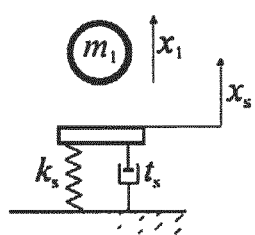
FIG. 11 shows a soft impact model as massless fender supported by damper and spring.

Identification of the material characteristics may also be achieved using a method based on the acceleration of the drill-bit. A simple impact model shown in FIG. 11, where the mass $m_1$ collides with the base modeled as a light fender supported by a light spring with the restitution coefficient $k_s$ and light viscous damper with the damping coefficient $t_s$. The dynamics of the model is governed by the following equation:

$$\ddot{x}_s + 2h_s\dot{x}_s + \alpha_s^2 x_s = 0 \qquad (1)$$

where $$h_s = \frac{t_s}{2m_1}$$

and $$\alpha_s^2 = \frac{k_s}{m_1}.$$

The solution of Eq. (1) is as follows:

$$x_s = e^{-h_s\tau}(A\cdot\sin\lambda_s\tau + B\cdot\cos\lambda_s\tau)$$

$$\dot{x}_s = h_s e^{-h_s\tau}(A\cdot\sin\lambda_s\tau + B\cdot\cos\lambda_s\tau) + \lambda_s e^{-h_s\tau}(A\cdot\cos\lambda_s\tau - B\cdot\sin\lambda_s\tau) \qquad (2)$$

where $\lambda_s = \sqrt{\alpha_s^2 - h_s^2}$ is the frequency of the damped oscillations. Assuming that the velocity of the colliding body at the collision is given by $v_0$, one gets the following initial conditions $$\tau = 0 \Rightarrow x_s = 0, \dot{x}_s = v_0$$

So Eq. (2) takes the form $$x_s = e^{-h_s\tau}\frac{v_0}{\lambda_s}\sin\lambda_s\tau$$

$$v_s = -h_s e^{-h_s\tau}\frac{v_0}{\lambda_s}\sin\lambda_s\tau + \lambda_s e^{-h_s\tau}\frac{v_0}{\lambda_s}\cos\lambda_s\tau$$

At the beginning of mass $m_1$—fender contact and at its end after time $\tau_i$ oscillator (1) is in the equilibrium state so the contact takes place during the time equal to the half of the oscillation period:

$$\tau_i = \frac{1}{2}T_i = \frac{\pi}{\lambda_s}$$

Figure 12:
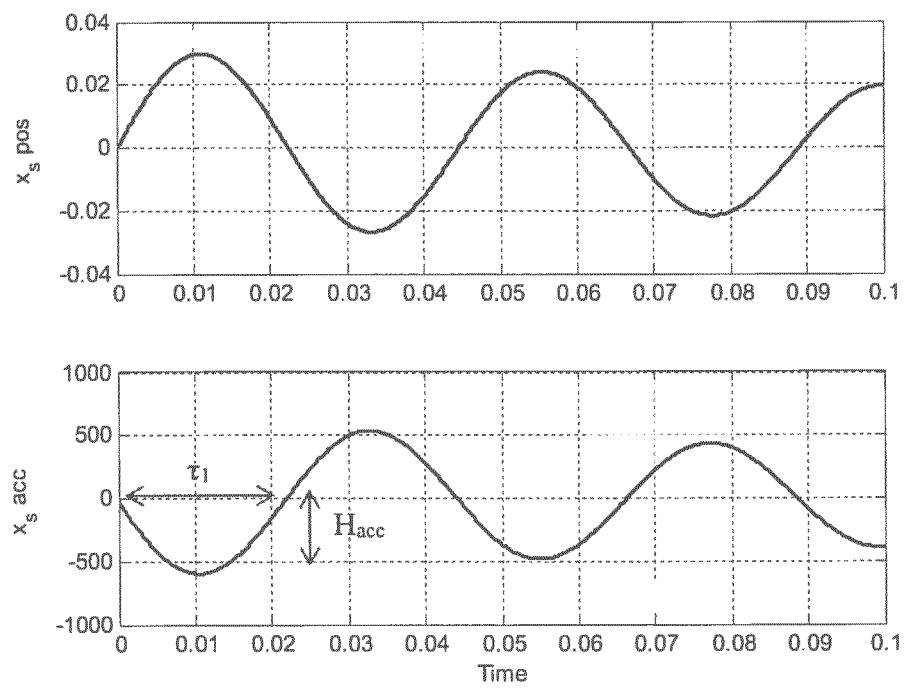
FIG. 12 shows the time history of a single impact calculated for $m_1=1$ kg, $h_0=1$ m, $g=9.8$ m/s$^2$, $t_s=9.5$ Ns/m, $k_s=20\times10^3$ N/m. The displacement of mass $m_1$ is shown by the upper line, and its acceleration is marked by the lower line.

FIG. 12 presents the equivalent response of mass $m_1$ when impacts with fender at first time. As can be seen from the figure, impact duration $\tau_1$ and impact amplitude $H_{acc}$ are marked for the first impact, and these two vital parameters are used to construct the impact map which can identify the characteristic of the rock.

If the control parameters are kept constant, for different types of rock, the impact duration and the impact amplitude are different. For soft types of rock, the impact duration is longer and the impact amplitude is smaller. For hard types of rock, the impact duration is shorter, and the impact amplitude is larger.

Figure 13:
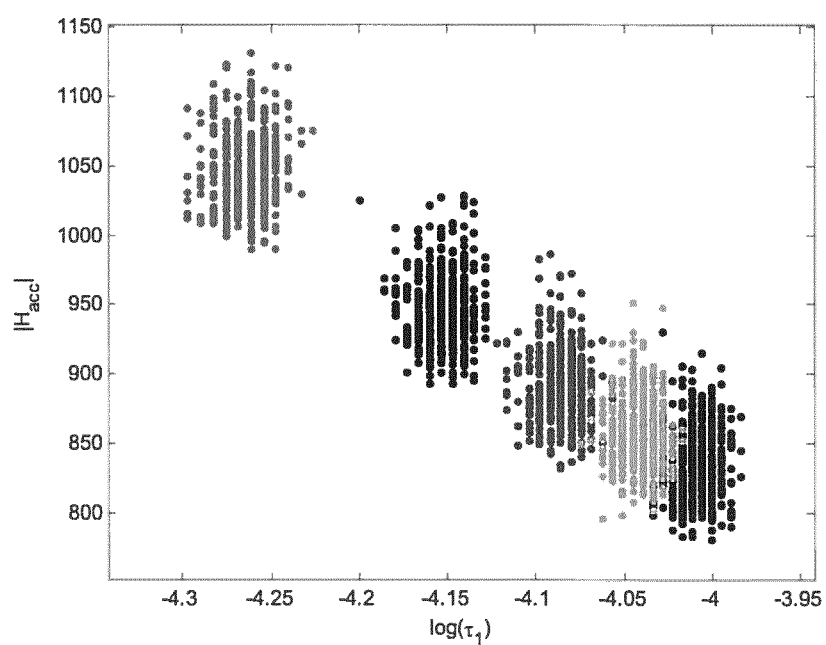
FIG. 13 shows an impact map with various stiffness coefficients calculated for $m_1=1$ kg, $h_0=1$ m, $g=9.8$ m/s$^2$, $t_s=9.5$ Ns/m, $k_s=30\times10^3$ N/m (lower left dot groups), $k_s=32\times10^3$ N/m (next higher dot group), $k_s=35\times10^3$ N/m (next higher dot group), $k_s=40\times10^3$ N/m (next higher dot group), and $k_s=50\times10^3$ N/m (upper right dot group).

FIG. 13 shows the impact map with various stiffness coefficients using the same control parameters. When the stiffness increases (from bottom right to top left), the impact duration becomes shorter and the impact amplitude becomes larger. So it is straightforward to identify the stiffness of the rock by monitoring the location of the impact in this map.

Figure 14:
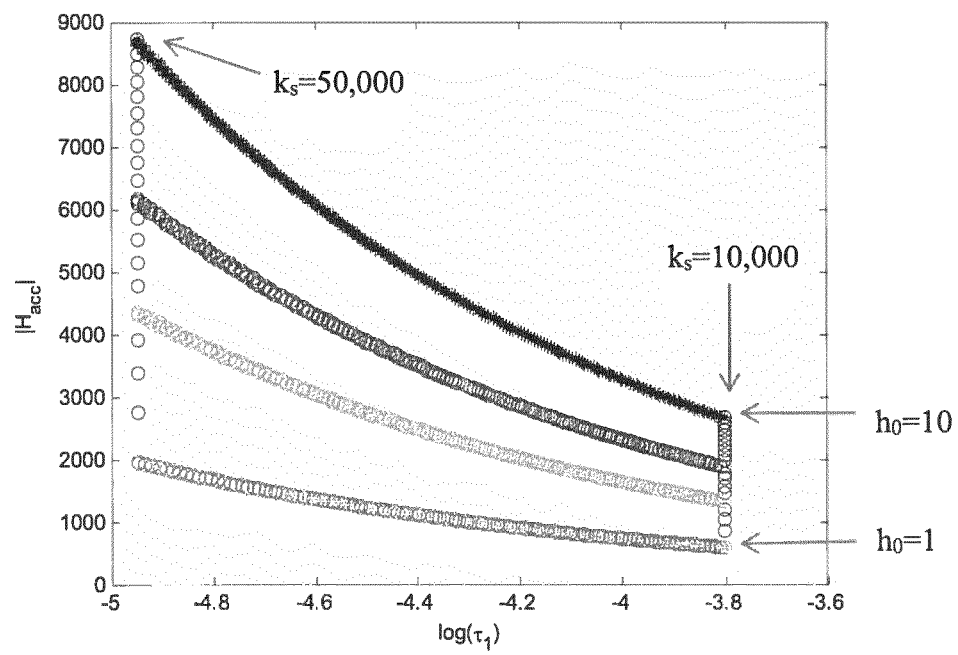
FIG. 14 shows an impact map with various stiffness coefficients and different impact velocity calculated for $m_1=1$ kg, $g=9.8$ m/s$^2$, $t_s=9.5$ Ns/m.

To understand the impact action more, FIG. 14 shows the impact map with various stiffness coefficients and different impact velocity. It is found that, with the same stiffness coefficient, the impact duration remains unchanged when the impact velocity is different. It can also be concluded that the variation of the stiffness of the rock by applying larger impact velocity (marked by the uppermost circles) is more obvious than the variation by applying smaller impact velocity (marked by the lowermost circles). This phenomenon is interesting as it demonstrates the requirement to operate RED in a resonant condition.

Penetration-Based Identification

The main difference between impact identification and this method is that, the former considers the geometry of an impact action by using the impact duration and the impact amplitude of an acceleration single, while the later considers the impact amplitude of an acceleration single and the penetration of the drill-bit into the rock.

Figure 15:
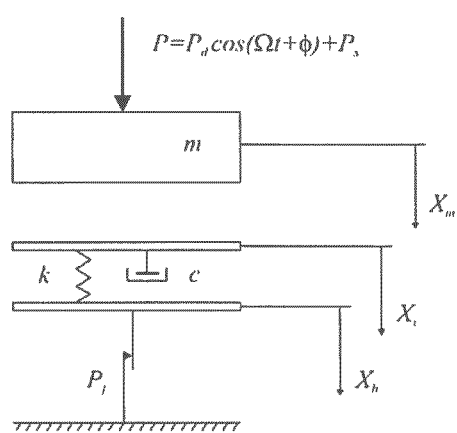
FIG. 15 shows a physical model of drifting oscillator.

An impact oscillator with drift as shown in FIG. 15 is considered (adapted from Pavlovskaia E., Wiercigroch M., Grebogi C.: (2001), Modelling of an impact system with a drift, Phy Rev E, 64, 056224) where a mass m is driven by an external force containing a harmonic component of amplitude $P_d$, frequency $\Omega$ and phase shift $\varphi$, and a static component, $P_s$. It is assumed that at the initial moment $t=0$, a gap G is the distance between the mass and the weightless slider top plate which is connected to a slider bottom plate by a linear spring with stiffness k, and a viscous damper with damping coefficient c. $X_m$, $X_t$, $X_b$ represent the absolute displacement of the mass, slider top, and slider bottom, respectively. It is assumed that gravity force is included in the static force, or the model operates in a horizontal plane.

The considered system is written to the set of first-order differential equations:

$x'=y$, $y'=a\cos(\omega\tau+\varphi)+b-P_1P_2(1-P_3)(2\xi y+z-v)-P_1P_3$, $z'=P_1y-(1-P_1)(z-v)/2\xi$, $v'=P_1P_3P_4[y+(z-v-1)/2\xi]$. (3)

where H(.) is the Heaviside function described as $P_1=(x,z)=H(x-z-g)$, $P_2=P_2(z,z',v)=H(2\xi z'+z-v)$, $P_3=P_3(z,z'v)=H(2\xi z'+z-v-1)$, $P_4=P_4(v')=H(v')$, Assuming the stiffness of the linear spring k is unknown, the purpose of this method is to estimate the stiffness of the drifting oscillator which mimics the stiffness of the rock during a drilling process.

Figure 16:
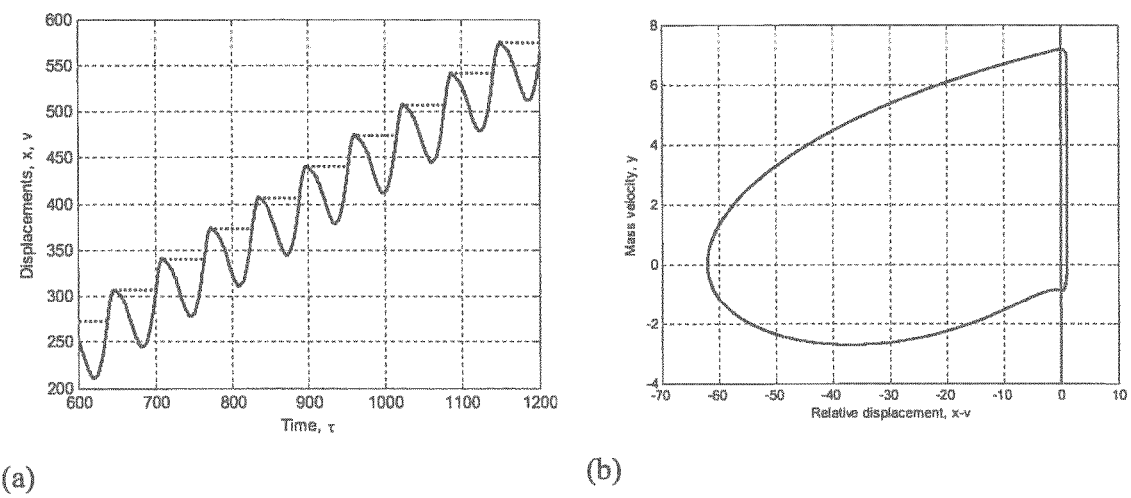
FIG. 16($a$) shows displacement of the mass, x (solid line) and slider bottom, v (dash line) versus time, τ calculated for $a=0.3$, $b=0.16$ $\xi=0.05$, $\omega=0.1$, $g=0.02$, and $\varphi=\pi/2$.

A time history of displacement of the investigated system is shown in FIG. 16(a), which solid line represents the displacement of the mass and dash line represents the displacement of the slider bottom. As can be seen, the system is in period-1 response which the mass has one impact with the slider top per period of forcing. In Pavlovskaia E., Wiercigroch M., Grebogi C.: (2001), Modelling of an impact system with a drift, Phy Rev E, 64, 056224, it has been found that the phase portrait using the mass velocity y versus the relative displacement x-v as shown in FIG. 16(b) gives better insight into this impact behaviour. However, from phase portrait, it is difficult to estimate the acceleration of the mass during the impact with slider top. This impact behaviour has been used to mimic the impact between drill-bit and rock. If the stiffness of the rock is identified during impact, appropriate dynamic and static force can be applied in order to achieve optimum penetration rate. The present invention provides a method for stiffness identification by constructing the phase portrait using mass acceleration and relative displacement.

Figure 17:
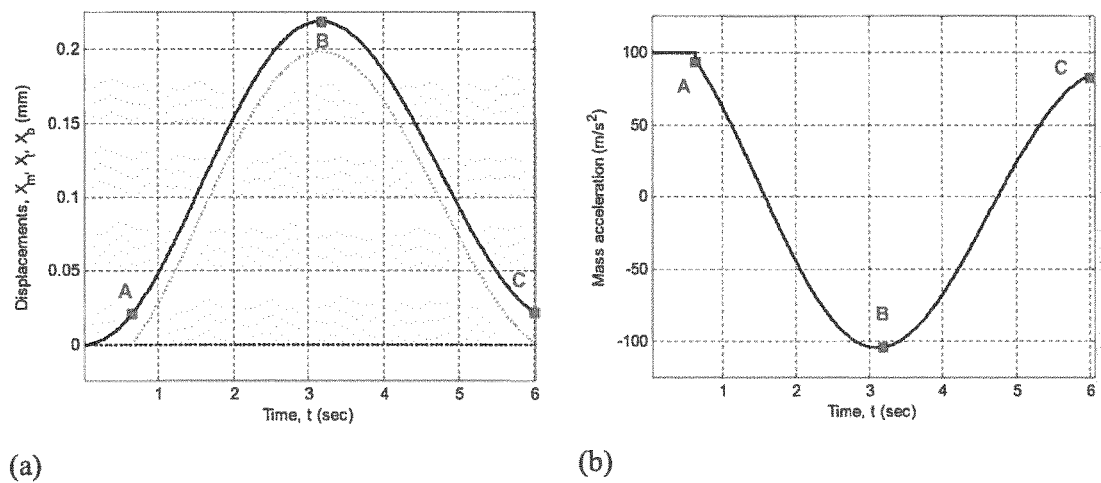
FIG. 17($a$) shows displacement of the mass (solid line), slider top (dash line), and slider bottom (dotted line) (b) acceleration of the mass calculated for $a=0.1$, $b=0$, $\xi=0.05$, $\omega=0.1$, $g=0.02$, and $\varphi=\pi/2$.
Figure 18:
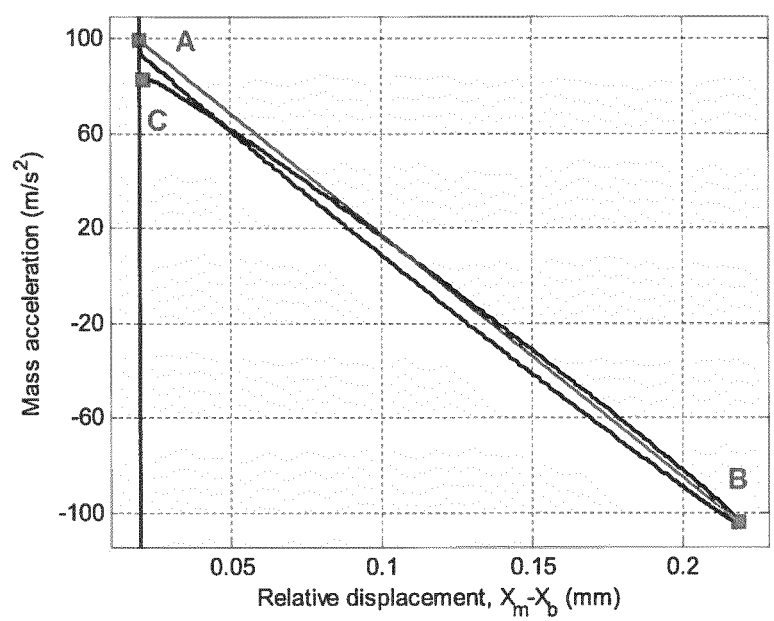
FIG. 18 shows the trajectory of acceleration of the mass versus relative displacement (curved line) with impact surface (vertical line) calculated for $a=0.1$, $b=0$, $\xi=0.05$, $\omega=0.1$, $g=0.02$, and $\varphi=\pi/2$.
Figure 19:
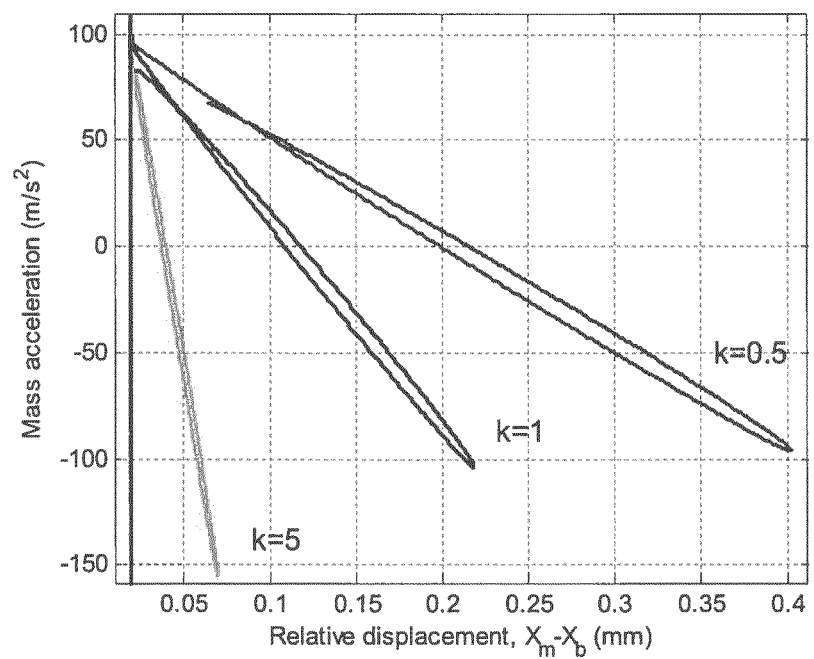
FIG. 19 shows trajectories of mass acceleration versus relative displacement with impact surface (leftmost line) calculated for $a=0.1$, $b=0$, $\xi=0.05$, $\omega=0.1$, $G=0.02$, $\varphi=\pi/2$, $k=0.5$ (rightmost line), $k=1$ (middle right line), and $k=5$ (middle left line).

Numerical results in FIG. 17 show a time history of the system with impact only, which FIG. 17(a) presents the displacements of the mass, slider top, and slider bottom, and FIG. 17(b) presents the acceleration of the mass during impact. FIG. 18 shows the trajectory of acceleration of the mass versus relative displacement. Three critical points, A, B, and C are marked in FIGS. 17 and 18 which indicate start of impact, maximum of relative displacement, and end of impact, respectively. As can be seen, from point A, the mass starts to contact and moves downwards together with slider top, and the reactive force from slider top acting on the mass increases immediately. Once the mass stops by the reactive force, the acceleration of the mass achieves maximum along upwards direction and the relative displacement between the mass and the slider bottom is also maximum. If the reactive force is larger, the maximum of acceleration in upwards direction is larger and the maximum of relative displacement is shorter. It is therefore we can conclude that the maximums of acceleration of the mass and the relative displacement are dependent of stiffness coefficient of the linear spring. FIG. 19 demonstrates the conclusion above by simulating the system using three different stiffness coefficients. It is seen that the response with stiffness coefficient, k=0.5 shows the largest relative displacement and the smallest mass acceleration, while the response with stiffness coefficient, k=5 shows the smallest relative displacement and the largest mass acceleration.

NARMAX-Based Identification

The behavior of piecewise linear oscillators subject to sinusoidal inputs have been extensively studied (see Wiercigroch M., Wojewoda J., Krivtsov A. M.: (2005), Dynamics of ultrasonic percussive drilling of hard rocks, J. Sound and Vibration, 280, 739-757). However, most of the investigations have been focused on characterizing complex dynamical regimes observed when the input amplitude or frequency is changed by means of bifurcation maps (see Ing, J., Pavlovskaia, E., Wiercigroch, M., Soumitro, B. "Experimental study of impact oscillator with one-sided elastic constraint". Phil. Trans. R. Soc. A, 366 (2008), 679-705). Although this information provides a useful insight about the drill response when working on a known environment, it cannot be used to identify a new scenario, which is associated with a physically meaningful stiffness change. The inventor has addressed this issue by using nonlinear systems modeling and analysis.

Figure 20:
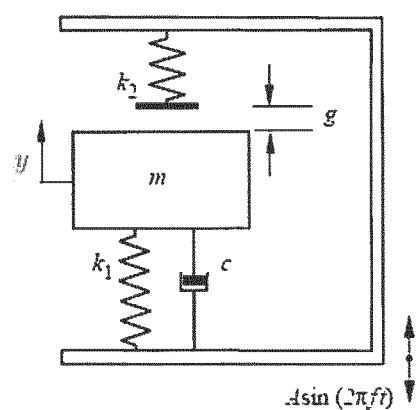
FIG. 20 shows a mathematical model of an impact oscillator (see Ing, J., Pavlovskaia, E., Wiercigroch, M., Soumitro, B. "Experimental study of impact oscillator with one-sided elastic constraint". Phil. Trans. R. Soc. A, 366 (2008), 679-705).

The methodology consists of building a polynomial NARMAX (Nonlinear AutoRegressive Moving Average with eXogenous inputs) model (see Leontaritis, I. J., Billings, S. A. "Input-output parametric models for nonlinear systems, Part I: deterministic nonlinear systems". International Journal of Control, 41 (1985), 303-328) using input-output data from an impact oscillator system shown in FIG. 20. Then, the response of the identified model is analyzed in the frequency domain by extracting the system NOFRFs (Nonlinear Output Frequency Response Functions) (see Lang, Z. Q., Billings, S. A. "Energy transfer properties of non-linear systems in the frequency domain". International Journal of Control, 78 (2005), 345-362) over a certain frequency range of interest, using a novel general framework based on ALEs (Associated Linear Equations) (see Feijoo, J. A. V., Worden, K. and Stanway, R. "Associated linear equations for Volterra operators". Mechanical Systems and Signal Processing, 19 (2005), 57-69). Simulation studies have been conducted. The results demonstrate that a simple NOFRFs energy based index can significantly distinguish different scenarios of stiffness changes so as to be able to use to monitor the system's operational conditions.

Consider the dimensionless model of the impact oscillator:

$$\frac{d^2 x}{d\tau^2} + 2\xi \frac{dx}{d\tau} + x + \beta(x-e)h(x-e) = u$$

Adopted parameters are $$\xi = \frac{c}{4\pi m f_n}$$

and $$e = \frac{g}{x_0},$$

where m=1, g=0.00126, $f_n$=9.38, c=1.3, $x_0$=0.001. Different values of β were used in different simulations. The following values were tested: β=1, 5, 6, 8, 10, and 20.

The system was identified using a sinusoidal input:

$$u = \frac{Af^2}{f_n x_0} \sin\left(\frac{f}{f_n}\tau\right)$$

where A=0.005 and f=8. These values were chosen because they produce distinguishable and simple (no bifurcations) outputs for the studied range of β (smaller frequencies yield outputs which are too similar, larger frequencies produce dynamical regimes which are very difficult to identify).

The system was integrated using 4-th order Runge-Kutta solver with a fixed $\tau_s$=0.06 integration step. Each simulation runs until $\tau_f$=294.62 (5000 points).

NARMAX models with a maximum delay of 2 samples and nonlinearities up to third degree were identified using an ERR-based orthogonal estimator. The thresholds for Moving Average (MA) and non-MA terms were $10^{-8}$. NOFRFs were estimated for the sinc input:

$$u = \frac{Af^2}{f_n x_0} \mathrm{sinc}\left(150\tau_s\left(\tau - \frac{\tau_f}{2}\right)\right)$$

by splitting each NARMAX model into the corresponding Associated Linear Equations (ALEs). The n-th order NOFRF is obtained by dividing DFT of the n-th order ALE output by the DFT of $u^n$. These estimates are reliable for 1≤k≤1000, which is the frequency range of the sinc input.

The measurement that allows distinguishing between different cases is the energy of the n-th order NOFRF:

$$M_n = \frac{1}{1000} \sum_{k=1}^{1000} |G_n(k)|^2$$

where $G_n(k)$ is the n-th order NOFRF at frequency component k.

The identification result is presented in Table 4 which shows how the index changes for different stiffness values.

TABLE 4

Identification result for various stiffness values

| β | $M_1$ | $M_2$ | $M_3$ |
|---|---|---|---|
| 1 | 2.9092 | 0.0359 | 0.0002 |
| 5 | 1.0680 | 0.4267 | 49.4126 |
| 6 | 2.7188 | 2.0404 | 49.9415 |
| 8 | 2.1352 | 3.2787 | 244.7598 |
| 10 | 0.6224 | 0.2011 | 26.6961 |
| 20 | 8.8768 | 28.6581 | 266.0859 |

The RED Module

The RED drilling module forms part of the apparatus of the invention. Typically, the RED module is operating in a down-hole location at the end of a drill string. The sensors are typically located on the module, and the control system may also carry out its processing functions on the module, or alternatively the processing may be carried out remotely by sending signals to a remote processor via the drill string.

In typical embodiments, the RED module is modular, with the following components:
External casing
Actuation unit
Vibro-isolation unit
Vibro-amplification unit
Bottom connection unit
Internal piping
External seals Each unit is typically designed specifically to permit it being built independently of other units. This makes it possible to have different units manufactured simultaneously in different locations, thus saving time required to produce the module. Standard connections such as flanges, clutches, and bolts are used to join the units in the assembly.

Furthermore, this design feature permits easy modification of the module for specific conditions and locations. As each unit is independent, it can be taken out, rebuilt, and then reassembled with the rest of the construction without the need to change parts in other units.

Only partial disassembly is required when removing a unit due to advantageous arrangement of the RED module. The module typically comprises an external casing into which an actuator unit with the activation coils is placed. Since the actuation unit and the amplification unit are not permanently fixed to each other, the actuation unit can be removed without detaching the other unit. Therefore, the module can be taken apart in two ways, from the top or from the bottom.

Actuation Unit

Figure 2:
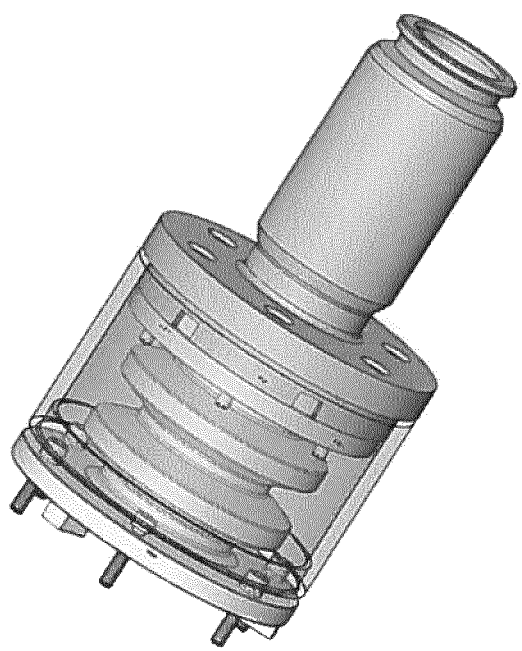
FIG. 2 shows a schematic of the vibro-isolation unit.

An exemplary drilling module is shown in FIGS. 1-3. The core of the RED module is the actuation unit, which provides the required oscillation of the drill-bit. It is typically composed of four main parts:
- shafts made of an actuation material (e.g. a magnetostrictive material) such as Terfenol-D;
- electrical coils, e.g. made of copper;
- flex return bars made, for example, from Permedyn, and
- a stainless steel cylinder, i.e. a back mass, to which other parts are attached.

A three layer arrangement of the parts is ideal for creating and maintaining a continuously varying electromagnetic field necessary to achieve the elongation and contraction of the actuation material (e.g. Terfenol shafts) is preferred. The central portion of the module in FIG. 1 shows a cross-section of this arrangement.

In this Example, the two shafts are placed inside the two copper coils, where the strength of the electromagnetic field is highest. In the final layer, flux return bars are placed on the outside of the coils as well as the top and bottom to ensure an adequate flux of the electromagnetic field. The entire structure may be supported, for example, by plastic plates made of epoxy fibreglass.

Pre-tension may be applied to the actuation material (e.g. Terfenol shafts) to ensure its stability during operation, and may be controlled with an efficient system located inside the steel back mass. A standard die spring may be used to adjust the changes in the pretension due to the varying operating conditions thus preventing cracking in the Terfenol material, which is particularly sensitive to jumps between compressive and tensile stresses.

When the actuation material (e.g. Terfenol shafts) is hollow (as is preferred), a stainless steel rod can be placed in its centre through which fluid can also flow (thus cooling the actuator shafts from the inside). The pretension rod may enclose the actuator at the bottom where it transmits the oscillations to the amplification unit.

Vibro-Isolation Unit

Dynamic loading generated by the actuator inside the casing is transmitted to the bottom as well as the top of the RED module. Unlike at the bottom, where additional excitation is desirable, oscillating top parts, especially the connection to the rest of the drill-string, are not desired. Therefore, a RED vibro-isolator unit is provided, typically between the back mass and the connection. This prevents oscillations from travelling up to the drill-string and damaging devices that might be installed behind the RED module. The vibro-isolator may be assembled in a unit (for example as in FIG. 2). The unit may comprise a RED spring (located at the lower end of the unit in FIG. 2). This may typically be any spring system suitable for isolating or damping the oscillations, but typically it comprises a frusto-conical spring system such as a Bellville spring system.

Vibro-Transmission (or Vibro-Amplification) Unit

Together with the actuation unit, the transmission or amplification unit represents the core of the RED module. Components in this unit can be separated into two main groups:
- a RED spring for delivering amplification of the oscillations, typically with a spring holder, and
- a torque (or torsion) restraint system (or unit).

Figure 3A:
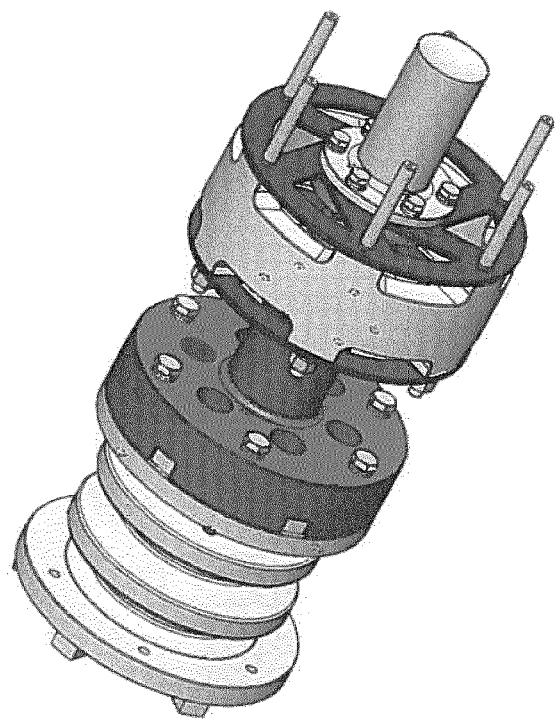
FIG. 3a shows a schematic of a vibro-transmission unit including two torque restraint discs forming part of a torque restraint system.

A typical example is shown in FIG. 3*a*. The RED spring is located at the lower end of the unit and the torque restraint system at the upper end of the unit. The RED spring may typically be any spring system suitable for amplifying or transmitting the oscillations, but typically it comprises a frusto-conical spring system such as a Bellville spring system.

The RED spring system in both the vibro-isolator and the vibro-amplifier is typically one such that the force, P, applied to the spring system can be determined according to the following equation:

$$P = \frac{1.1 E \delta C}{R^2}\left[(h-\delta)\left(h-\frac{\delta}{2}\right)t + t^3\right]$$

wherein t is the thickness of the frusto-conical springs, h is the height of the spring system, R is the radius of the spring system, δ is the displacement on the spring system caused by the force P, E is the Young modulus of the spring system, and C is the constant of the spring system.

Typically the spring system of the vibration isolation unit (or vibration damping unit) satisfies the following equation:

$$\omega/\omega_n \geq 2.3$$

wherein ω represents an operational frequency of axial vibration of the resonance enhanced rotary drilling apparatus, and $\omega_n$ represents the natural frequency of the spring system of the vibration damping and/or isolation unit.

Typically the spring system of the vibration transmission unit (or vibration enhancement unit) satisfies the following equation:

$$0.6\omega/\omega_n 1.2$$

wherein ω represents an operational frequency of axial vibration of the resonance enhanced rotary drilling apparatus, and $\omega_n$ represents the natural frequency of the spring system of the vibration enhancement and/or transmission unit.

The torsion restraint unit is preferred to be present in the vibration transmission part of the apparatus. As has been mentioned above, in resonance enhanced drilling operations, it is necessary to ensure that the drill-bit is both rotating and oscillating. However, the inventors have discovered that typical means for imparting oscillatory loading (such as magnetostrictive oscillators) are sensitive to torsional loads, and may quickly cease to function if these are not controlled. This is not a problem in known apparatus for non-resonance enhanced methods which are not employing highly controlled combinations of rotational and oscillatory loading. Thus, the torsion restraint unit is preferred in order to reduce the torsional loading on the oscillator.

Figure 3B:
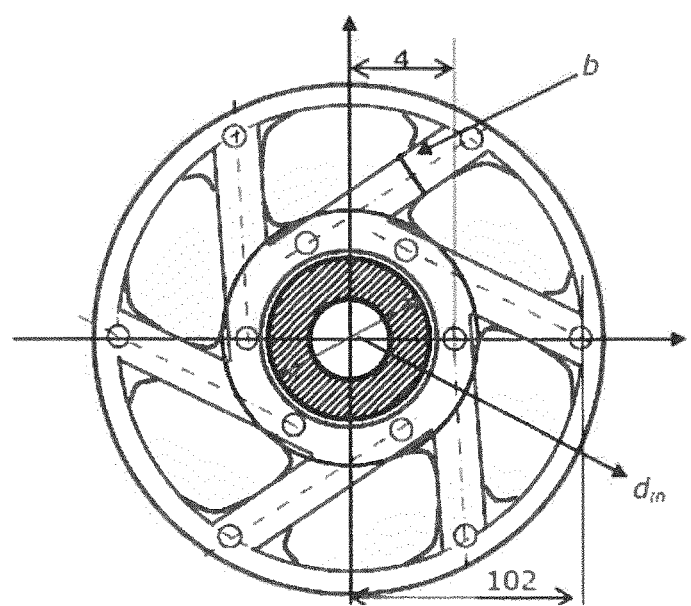
FIG. 3b shows a schematic of a typical torque restraint disc.

The nature of the torsion restraint unit is not especially limited, provided that it is capable of reducing the torsional load on the oscillator, as compared with the torsional load in the absence of the torsion restraint unit. In typical embodiments, the torsion restraint unit comprises a membrane torsion restraint unit. In the present context, membrane means a configuration wherein the torsion restraint unit comprises a broad, flat structure. Generally, but not exclusively, the torsion restraint unit is in the form of a disc, with an axial dimension that is less than its radial dimension. A typical example of such a unit is shown in FIG. 3b. In typical embodiments, the torsion restraint unit has greater torsional stiffness than axial stiffness. To maximise this capability, further structure may be provided, such as a disc with holes defining a number of spokes, radii, or spars for spreading the forces applied to the unit across its structure. A typical example of this is shown in FIG. 3b.

One or two or more torque restraint discs may be used in general, and two are used in the specific example vibro-transmission unit shown in FIG. 3a. These are used to prevent unwanted bending of the bottom of the module. Furthermore, in this example a single torque restraint might not be sufficient for the increased torsional load experienced by the module. Therefore, two torque restraints separated by a stiff ring are provided for adequate support in the torsional direction, while still being flexible enough in the axial direction to transmit the force generated by the actuator.

Sensors

Figure 36:
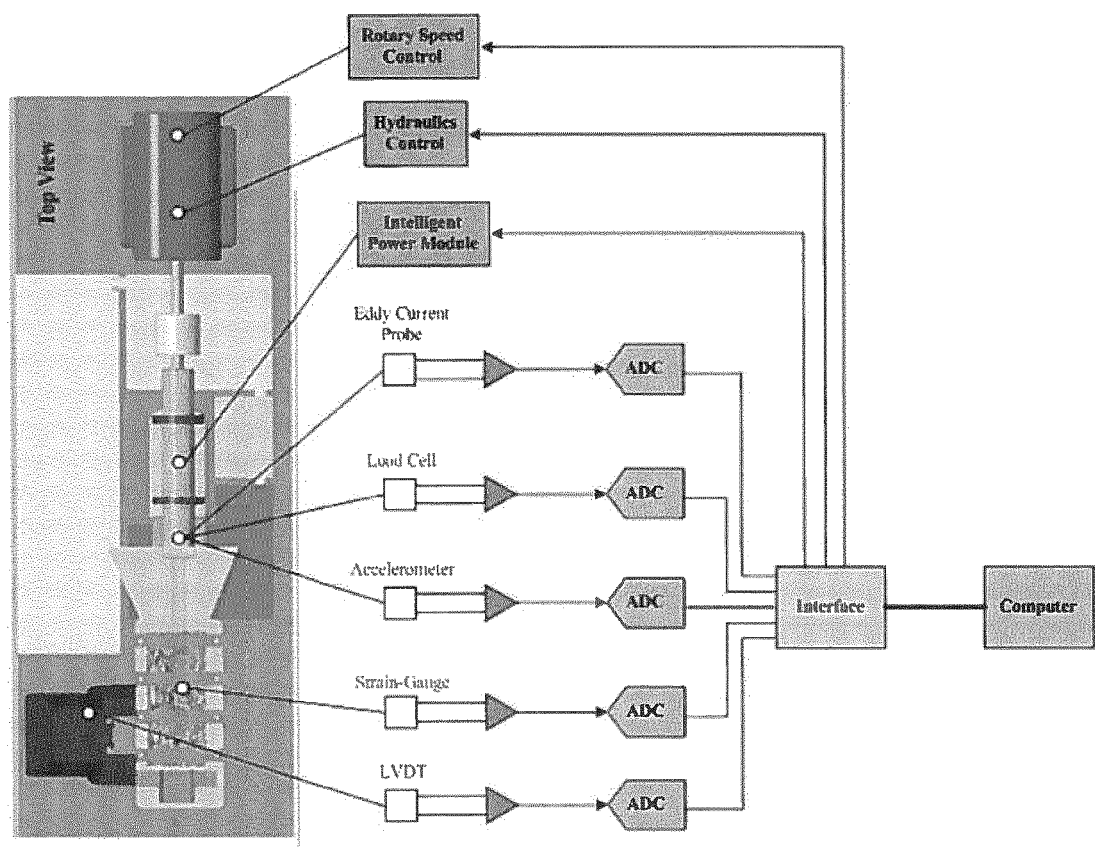
FIG. 36 shows a schematic of the apparatus of the invention, including the RED module and its various components, and the control system including the sensors and the processing system.

FIG. 36 shows a schematic example of the apparatus of the invention, including the RED module and its various components, and the control system including example sensors and the processing system.

Accelerometer

When an accelerometer is used, it may be any type of accelerometer. However, in some embodiments a Kistler Type 8395A050 accelerometer may be employed. It is a high sensitivity, low noise tri-axial accelerometer which simultaneously measures accelerations and/or low-frequency vibration in three mutually perpendicular axes. This accelerometer utilizes a silicon Micro-Electro-Mechanical System variable capacitance sensing element. The sensing element of each axis consists of a very small inertial mass and a flexure element cantilever positioned between two plates. As the mass deflects under acceleration, the capacitance between these plates changes. AC excitation and synchronous amplitude demodulation circuitry contained in the accelerometer's internal signal conditioner provides an analogue output signal proportional to the applied acceleration. This output signal is scaled as a voltage which is proportional to the applied acceleration.

In the RED module, close to the actuator, the temperature can be very high which presents a challenge. However, the Kistler Type 8395A050 has an operating temperature range between −55 and 125° C. which is suitable for drilling. Moreover, no additional charge amplifier is required.

Load Cell

When a load cell is used, it may be any type of load cell. However, in some embodiments a FMT Load Washer Cell may be employed. This is designed to measure clamping and screwing forces. The sensor design reduces the hysteresis and sensitivity variations associated with torque generated by friction during tightening. The FMT has a high stiffness and can be used in static and dynamic applications. Another merit of this load cell is that it has a large diameter of central hole which allows sufficient drilling fluids to pass through.

Drill-Bit

In order to compare the effect of drill-bit type, extensive experiments have been carried out using a number of various drill-bits. These bits include 2¾" PDC, 3⅞" Tricone, 3⅞" PDC, 3⅞" Varel 4885 PDC, 3⅞" Varel 4919 PDC, and 6" Varel PDC. The main specifications of these bits are summarized in Table 5 Error! Reference source not found.:

TABLE 5 drill-bit specifications

| Bit Type | Diameter (ins) | Operating WOB (klbs) | Rotary Speed (rpm) |
| --- | --- | --- | --- |
| PDC | 2¾" | 2-11 | 40 - DHM |
| Tricone | 3⅞" | 5-20 | 60 - 350 |
| PDC | 3⅞" | 2-16 | 60 - DHM |
| Varel 4885 PDC* | 3⅞" | 4-12 | 80 - DHM |
| Varel 4919 PDC* | 3⅞" | 4-12 | 80 - DHM |
| PDC | 6" | up to 24 | for all rotary applications |

The experiments were carried out on sandstone, sandstone-quartz, and granite by testing the influence on WOB, rotary speed, frequency of excitation, and amplitude of excitation. The summary of the experimental programme is shown in Table 6:

TABLE 6 experimental programme summary

| Rock Type | Bit Type | Test Parameter |
| --- | --- | --- |
| Sandstone | Varel 4885 | WOB |
| Sandstone-quartz | Varel 4919 | Frequency |
| Granite | 3⅞" PDC | Amplitude |
|  |  | Rotary speed |

Sandstone

WOB

The detailed experimental parameters for Varel 4885, Varel 4919, and 3⅞" PDC bits are given in Table 7, Table 8, and Table 9, respectively. The frequency of excitation was fixed at 200 Hz, and the amplitude of excitation was fixed at 210 Volts for all the experiments. The single drilling section for ROP monitoring was 20 seconds and the rotary speed was maintained at 25 rpm. The WOB was tested from approximately 1 kN up to 8.4 kN.

TABLE 7

WOB test of Varel 4885 on sandstone

| Run no. | Mean of WOB (kN) | Rotary Speed (rpm) | Conventional RoP (mm/s) | RED RoP (mm/s) | Efficiency (%) |
| --- | --- | --- | --- | --- | --- |
| varel4885_wob | 3.0 | 25 | 0.0846 | 0.1648 | 194.7 |
| varel4885_wob_a | 4.2 | 25 | 0.1438 | 0.249 | 173.2 |
| varel4885_wob_b | 5.2 | 25 | 0.1948 | 0.3407 | 174.9 |
| varel4885_wob_c | 5.6 | 25 | 0.2388 | 0.3936 | 164.8 |
| varel4885_wob_g | 6.5 | 25 | 0.296 | 0.5462 | 184.5 |
| varel4885_wob_d | 7.3 | 25 | 0.3393 | 0.5537 | 163.2 |
| varel4885_wob_e | 8.4 | 25 | 0.5542 | 0.7285 | 131.4 |

TABLE 8

WOB test of Varel 4919 on sandstone

| Run no. | Mean of WOB (kN) | Rotary Speed (rpm) | Conventional RoP (mm/s) | RED RoP (mm/s) | Efficiency (%) |
| --- | --- | --- | --- | --- | --- |
| varel4919_wob_a | 2.1 | 25 | 0.225 | 0.3784 | 168.2 |
| varel4919_wob_b | 2.6 | 25 | 0.3248 | 0.5731 | 176.5 |
| varel4919_wob_c | 4.2 | 25 | 0.7807 | 0.9985 | 127.9 |
| varel4919_wob_d | 5.7 | 25 | 1.107 | 1.381 | 124.8 |

TABLE 8-continued

WOB test of Varel 4919 on sandstone

| Run no. | Mean of WOB (kN) | Rotary Speed (rpm) | Conventional RoP (mm/s) | RED RoP (mm/s) | Efficiency (%) |
|---|---|---|---|---|---|
| varel4919_wob_e | 6.4 | 25 | 0.9503 | 1.252 | 131.8 |
| varel4919_wob_f | 8.0 | 25 | 1.2044 | 1.4406 | 119.6 |

TABLE 9

WOB test of 3⅞" PDC on sandstone

| Run no. | Mean of WOB (kN) | Rotary Speed (rpm) | Conventional RoP (mm/s) | RED RoP (mm/s) | Efficiency (%) |
|---|---|---|---|---|---|
| SSnPDC7a | 0.9 | 25 | 0.0464 | 0.1149 | 247.9 |
| SSnPDC7b | 1.8 | 25 | 0.1668 | 0.2682 | 160.8 |
| SSnPDC7c | 2.7 | 25 | 0.3459 | 0.4261 | 123.2 |
| SSnPDC7d | 4.0 | 25 | 0.5024 | 0.8248 | 164.2 |
| SSnPDC7e | 4.9 | 25 | 0.6457 | 0.9474 | 146.7 |
| 387pdc_wob_a | 6.3 | 25 | 0.5588 | 1.048 | 187.5 |
| 387pdc_wob_b | 6.75 | 25 | 0.9922 | 1.189 | 119.8 |
| 387pdc_wob_c | 7.5 | 25 | 0.8984 | 1.311 | 146 |

Figure 37:
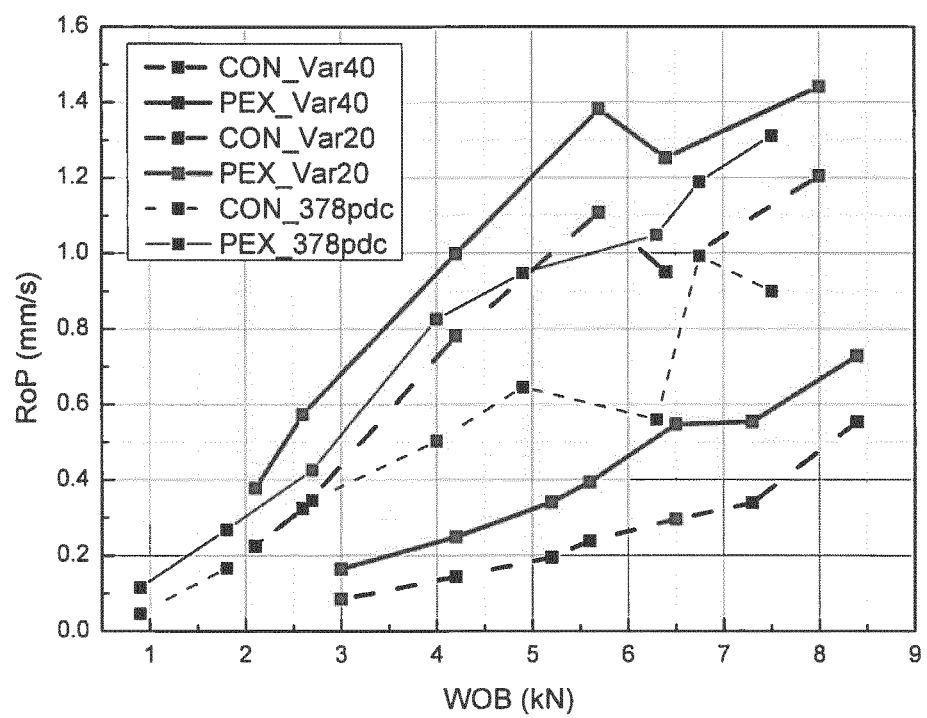
FIG. 37 shows results of drill bit testing, in this case a WOB test on sandstone.

The experimental result of WOB tests was graphically shown in FIG. 37. As can be seen from the figure, the solid block line represents the result with RED and the dash block line is the result without RED. The result of Varel 4919 is marked by the lines starting at WOB~2, Varel 4885 is marked by the lines starting at WOB~1, and 3⅞" PDC is marked by the lines starting at WOB~3.

The Varel 4919 gives the best ROP at both conditions (with RED and regular drilling). The 3⅞" PDC presents a better ROP than the Varel 4885. It should be noted that the improvement efficiency drops as the WOB increases which indicates that RED becomes less effective when WOB is large.

Frequency of Excitation

Figure 38:
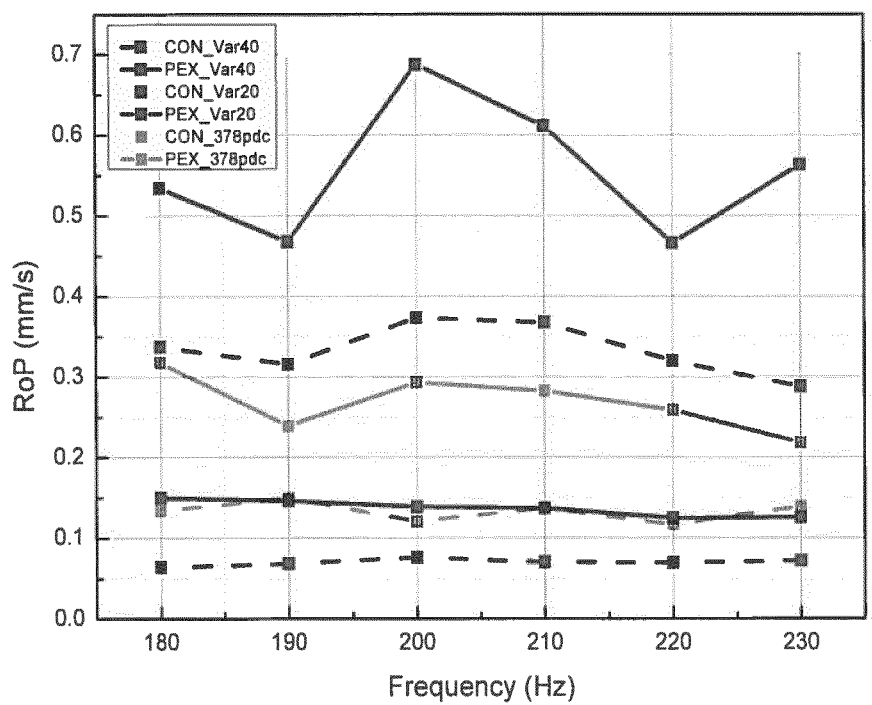
FIG. 38 shows results of drill bit testing, in this case a frequency test on sandstone.

The tests of frequency were carried out from 180 Hz to 230 Hz with fixed amplitude of 210 Volts. The WOB was maintained at 3.0 kN and the rotary speed was 25 rpm. FIG. 38 shows the result of frequency test on sandstone. It can be seen that the Varel 4919 has the best ROP both with and without RED. The Varel 4919 has a peak ROP at 200 Hz. For the other two bits, the 3⅞" PDC shows a better performance than the Varel 4885.

Amplitude of Excitation

The tests of amplitude of excitation using Varel 4885, Varel 4919, and 3⅞" PDC on sandstone were carried out. The WOB of the experiment was applied at 3 kN, and the speed was maintained at 25 rpm. The RED was operated at 200 Hz, and the amplitude was varied from 180 Volts up to 230 Volts. The result is graphically presented in FIG. 38. It is clear to see that Varel 4919 has the best ROP either with RED or without it. The 3⅞" PDC has better performance than the Varel 4885.

Rotary Speed

Figure 39:
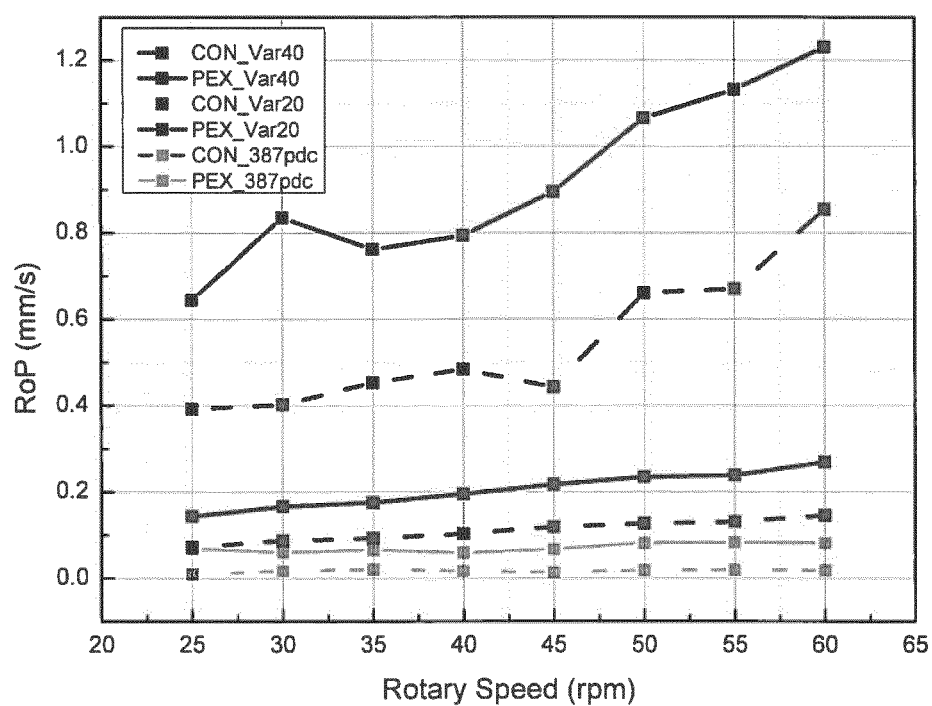
FIG. 39 shows results of drill bit testing, in this case a rotary speed test on sandstone.

The detailed parameters of the rotary speed test for these three bits were set for a rotary speed test. As can be seen from FIG. 39, the test was operated from 25 rpm up to 60 rpm, and the ROP has significant improvement when rotary speed increases.

Sandstone-Quartz

Figure 40:
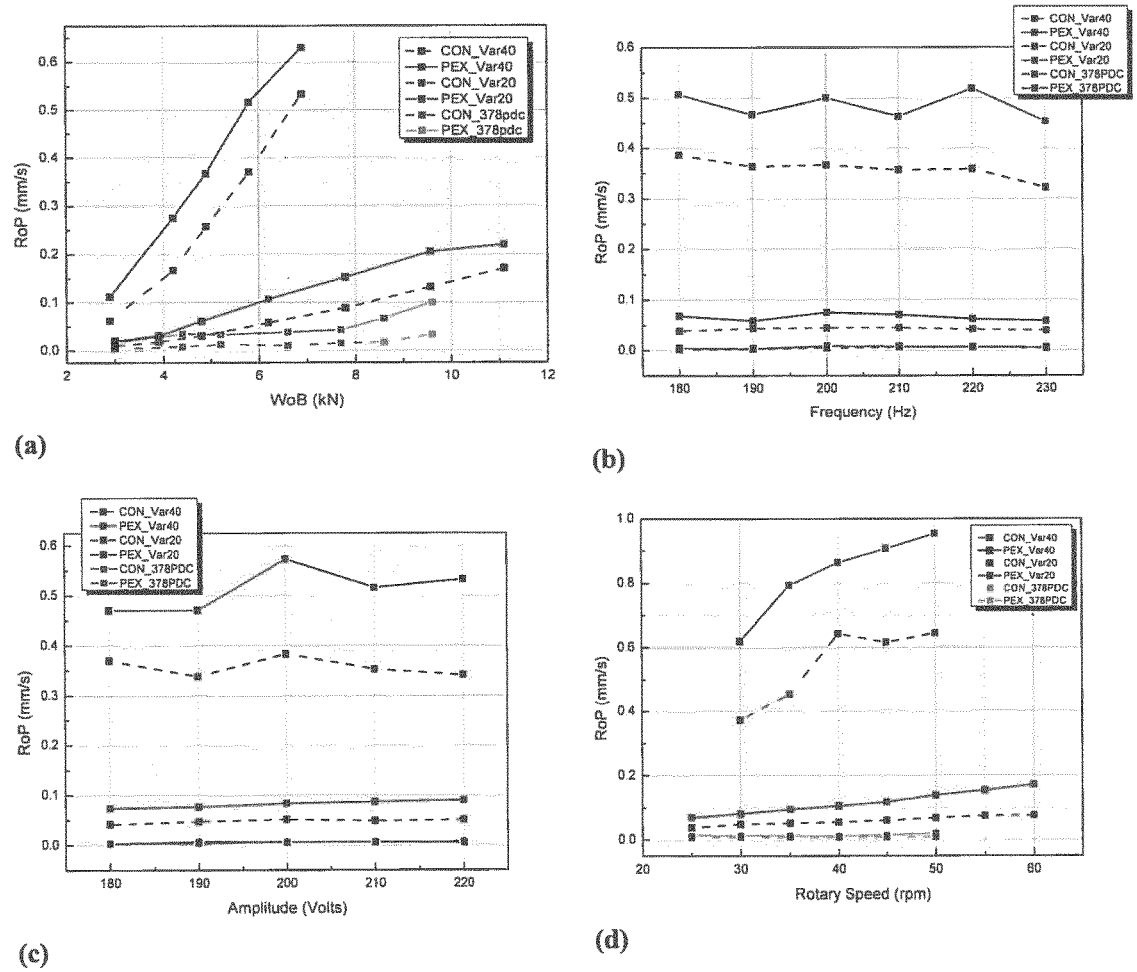
FIG. 40 shows (a) WOB (b) frequency (c) amplitude, and (d) rotary speed tests on sandstone-quartz.

The tests of WOB, frequency and amplitude of excitation, and rotary speed on sandstone-quartz were carried out by using Varel 4885, Varel 4919, and 3⅞" PDC. The experiment followed the same procedure of the experiment carried out on sandstone. The experimental results are graphically presented in FIG. 40.

The WOB test is presented in FIG. 40(a) which shows the test was operated from 3 kN up to 11 kN. As can be seen from the Figure, the ROP of Varel 4919 drastically improved when the WOB increased. The WOB has more effect on the ROP of Varel 4885 than the ROP of 3⅞" PDC.

The result of frequency test is shown in FIG. 40(b), and the frequency range varied from 180 Hz to 220 Hz. It can be seen that Varel 4919 has the best ROP than the other two bits, and the frequency of excitation has less effect on their ROPs.

The result of amplitude test is shown in FIG. 40(c), and the amplitude varied from 180 Volts up to 220 Volts. It is clearly seen that Varel 4919 has the best ROP and Varel 4885 has much better performance than 3⅞" PDC.

Similar observation can be made from FIG. 40(d), which shows the rotary speed test on sandstone-quartz. As the rotary speed increases, the ROP of Varel 4919 has significant improvement than the other two bits.

Granite

Figure 41:
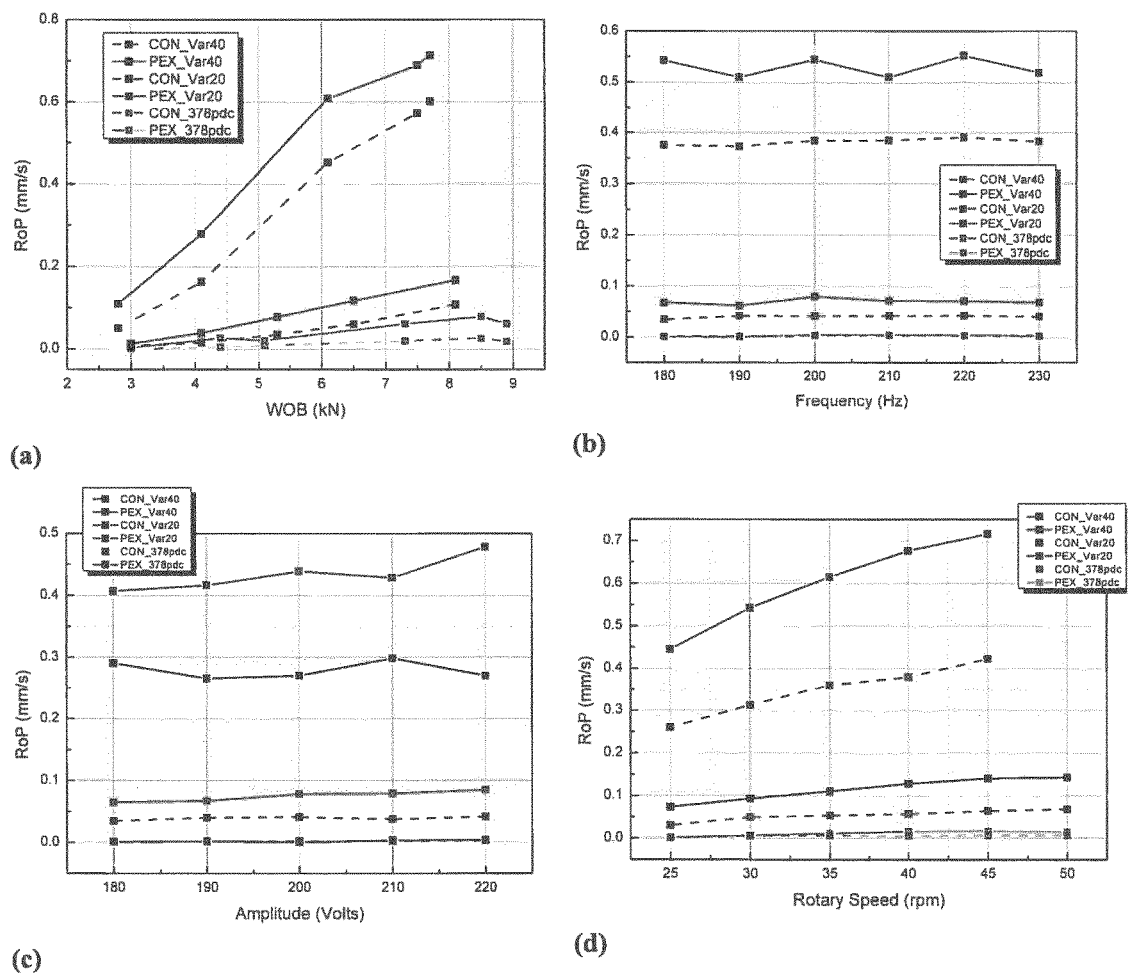
FIG. 41 shows (a) WOB (b) frequency (c) amplitude, and (d) rotary speed tests on granite.

The same experimental procedure has been used on the test of granite, and the experimental result is shown in FIG. 41. As can be seen from these figures, Varel 4919 has the best ROPs and shows significant difference than the other two bits. Both WOB and rotary speed have more effects on ROP while frequency and amplitude of excitation do not have so much influence on drilling performance.

In order to make a fair comparison, the experiments were carried out using the three bits with the same diameter and similar specifications, which are Varel 4885 PDC, Varel 4919 PDC, 3⅞" PDC. The experiments were also carried out on sandstone, sandstone-quartz, and granite to investigate the performance of the bits under various rock stiffness conditions. The experiments were executed almost the same conditions, i.e. WOB, rotary speed, and frequency and amplitude of excitation.

The experiments show that Varel 4919 has a very significant improved performance than the other two bits. Although Varel 4885 and Varel 4919 are customized bits for RED technology, the only difference is their back rake angle, which Varel 4885 is 40° and Varel 4919 is 20°. Therefore, it was confirmed that the back rake angle has significant influence on ROP.

Figure 42:
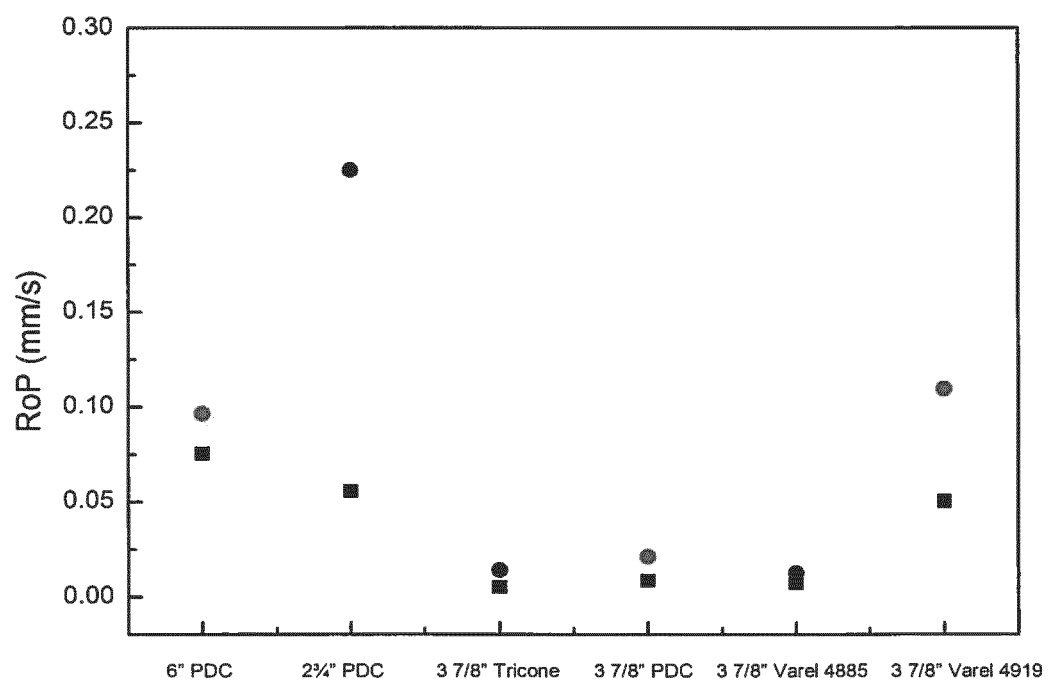
FIG. 42 shows a comparison of drill-bit performance under the same operational condition on granite (with RED: dots; without RED: squares).

FIG. 42 shows a comparison of six drill-bits including 6" PDC, 2¾" PDC, 3⅞" Tricone, 3⅞" PDC, 3⅞" Varel 4885, and 3⅞" Varel 4919 PDC. The comparison was made using 3 kN, 25 rpm, and 200 Hz of excitation with amplitude of 200 Volts. It is clearly seen that 2¾" PDC has a significant improvement with RED, and 3⅞" Varel 4919 PDC has a better improvement than the rest of bits. The result suggests that 2¾" PDC was operated at an optimum WOB while the rest are not.

This data confirms the advantages of the drill-bit aspects of the present invention. Accordingly, the present invention provides a drill-bit for drilling in a resonance enhanced drilling method, which drill-bit has a back rake angle of 40° or less. The drill-bits of the invention for resonance enhanced drilling are not especially limited, except that they should be adapted to resonance enhanced drilling by adapting the back rake angle to the required degree. In typical embodiments, the back rake angle is 35° or less, 30° or less, 25° or less, 20° or less, 15° or less or 10° or less.

The invention still further provides a method of resonance enhanced drilling, which method comprises operating a resonance enhanced drilling apparatus, which apparatus comprises a drill-bit as defined above.

Still further provided is an apparatus as described above, wherein the drill-bit comprises a drill-bit as defined above.

Yet further provided is a method of controlling a resonance enhanced rotary drill according to any of the control methods described above, wherein the drill-bit comprises a drill-bit as defined above.

The invention claimed is:

1. An apparatus for use in resonance enhanced drilling, which apparatus comprises a drilling module comprising a drill-bit, wherein the apparatus further comprises:
    a first sensor for measuring one or more parameters relating to the interaction of the drill-bit and the material being drilled; and
    a second sensor for measuring one or more motions of the drill-bit,
    wherein the drilling module comprises a control system for controlling one or more drilling parameters of the drilling module, wherein the control system employs information from the sensor to control the drilling parameters, and
    wherein the control system comprises:
    (a) first controller for determining one or more characteristics of the material to be drilled by employing information from one or more of the sensors, wherein the one or more characteristics of the material to be drilled comprises the stiffness or the effective stiffness of the material, and
    (b) a second controller for determining one or more drilling parameters to apply to the drilling module by employing information from one or more of the sensors and the one or more characteristics of the material to be drilled determined by the first controller.

2. The apparatus according to claim 1, wherein the one or more parameters relating to the interaction of the drill-bit and the material being drilled comprise one or more impact characteristics of the drill-bit with the material being drilled, and/or one or more forces between the drill bit and the material being drilled.

3. The apparatus according to claim 2, which apparatus comprises an accelerometer for measuring the one or more impact characteristics of the drill-bit with the material being drilled, and/or a load cell for measuring the one or more forces between the drill-bit and the material being drilled.

4. The apparatus according to claim 1, comprising an eddy current sensor for measuring one or more motions of the drill-bit.

5. The apparatus according to claim 1, the drilling module further comprises:
    an actuation unit comprising an oscillator for applying axial oscillatory loading to the rotary drill-bit;
    a vibro-amplification unit for transmitting the oscillatory loading to the drill-bit; and
    a vibro-isolation unit for reducing or preventing oscillation beyond the drilling module.

6. The apparatus according to claim 5, wherein the vibro-amplification unit comprises a spring system for transmitting the oscillatory loading to the drill-bit, and one or more torque restraint units for reducing or preventing torque from the rotary motion of the drill-bit transferring to the actuation unit.

7. The apparatus according to claim 1, wherein the first sensor is capable of measuring one or more of the following drilling parameters:

(a) axial drill force on the material being drilled (also called "weight on bit" (WOB), or "static force")
(b) the acceleration of the drill-bit and/or drilling module;
(c) the oscillatory axial drill force on the material being drilled (also called the "dynamic force"); and
(d) the rotary force or torque of the drill; and
wherein the second sensor is capable of measuring one or more of the following drilling parameters:
(e) velocity of speed of the drill-bit and/or drilling module (also known as the "rate of progression" (ROP));
(f) the frequency of oscillation of the drill-bit and/or drilling module;
(g) the amplitude of oscillation of the drill-bit and/or drilling module;
(h) the rotary velocity or rotary speed of the drill;
(i) fluid flow rate; and
(j) relative displacement of the drill-bit.

8. The apparatus according to claim 1, wherein the back rake angle is 35° or less, 30° or less, 25° or less, 20° or less, 15° or less or 10° or less.

9. The apparatus according to claim 1, wherein the drill-bit comprises a drill-bit having a back rake angle of 40° or less.

10. A method of drilling, comprising operating an apparatus of claim 1.

11. The method of drilling according to claim 10, which method comprises operating a resonance enhanced drilling apparatus comprising a drill-bit having a back rake angle of 40° or less.

12. A method of controlling a resonance enhanced rotary drill comprising an apparatus of claim 1, the method comprising:
    (a) employing one or more initial characteristics of the material being drilled, and/or one or more initial drilling parameters to control the drilling module;
    (b) measuring one or more current drilling parameters using the sensors to obtain one or more measured drilling parameters;
    (c) employing the one or more measured drilling parameters to calculate one or more characteristics of the material being drilled; and
    (d) employing the one or more calculated characteristics of the material being drilled, and/or the one or more measured drilling parameters, to calculate one or more calculated drilling parameters.

13. The method according to claim 12, wherein in step (d) one or more calculated drilling parameters from a previous iteration of the control process are employed as further input to determine the calculated drilling parameters.

14. The method according to claim 12, wherein the drilling parameters comprise one or more of the following:
    (a) axial drill force on the material being drilled (also called "weight on bit" (WOB), or "static force")
    (b) velocity or speed of the drill-bit and/or drilling module through the material being drilled;
    (c) the acceleration of the drill-bit and/or drilling module through the material being drilled;
    (d) the frequency of oscillation of the drill-bit and/or drilling module;
    (e) the amplitude of oscillation of the drill-bit and/or drilling module;
    (f) the oscillatory axial drill force on the material being drilled (also called the "dynamic force");
    (g) the rotary velocity or rotary speed of the drill;
    (h) the rotary force or torque of the drill on the material being drilled;

(i) fluid flow rate; and
(j) relative displacement of the drill-bit.

15. The method according to claim 12, wherein the characteristics of the material being drilled comprise one or more of:
(a) the compressive strength of the material
(b) the stiffness or the effective stiffness of the material;
(c) the yield strength of the material;
(d) the impact strength of the material;
(e) the fatigue strength of the material;
(f) the tensile strength of the material;
(g) the shear strength of the material;
(h) the hardness of the material;
(i) the density of the material;
(j) the Young's modulus of the material; and
(k) the Poisson's ratio of the material.

16. The method according to claim 12, wherein the one or more initial characteristics of the material being drilled in step (a) are obtained from empirical information, preferably from a database.

17. The method according to claim 12, wherein the one or more initial drilling parameters in step (a) are obtained from empirical information, preferably from a database.

18. The method according to claim 12, wherein the one or more calculated characteristics of the material being drilled in step (c) are obtained using one or more models, preferably one or more empirical models and/or one or more mathematical models.

19. The method of controlling a resonance enhanced rotary drill according to claim 12, wherein the drill-bit comprises a drill-bit having a back rake angle of 40° or less.

20. The method according to claim 12, further comprising step (e) of applying the one or more calculated drilling parameters to the drilling module.

21. The method according to claim 20, further comprising step (f) of repeating steps (b), (c), (d) and (e).

* * * * *